United States Patent
Kobayashi et al.

(10) Patent No.: US 6,688,335 B2
(45) Date of Patent: Feb. 10, 2004

(54) LIQUID HAMMER PREVENTION DEVICE

(75) Inventors: Tatsuya Kobayashi, Shizuoka (JP); Eiji Suzuki, Shizuoka (JP)

(73) Assignee: Suzuki Sogyo Co., Ltd., Shizouka (JP)

( * ) Notice: Subject to any disclaimer, the term of this patent is extended or adjusted under 35 U.S.C. 154(b) by 384 days.

(21) Appl. No.: 09/897,130

(22) Filed: Jul. 3, 2001

(65) Prior Publication Data

US 2002/0053364 A1 May 9, 2002

(30) Foreign Application Priority Data

Jul. 14, 2000 (JP) ........................................ 2000/214220
Feb. 19, 2001 (JP) ........................................ 2001/041405

(51) Int. Cl.$^7$ ............................................... F16L 55/04
(52) U.S. Cl. ....................................................... 138/30
(58) Field of Search ...................................... 138/30, 31

(56) References Cited

U.S. PATENT DOCUMENTS

| | | | | |
|---|---|---|---|---|
| 1,974,323 | A | * 9/1934 | Allen | 138/30 |
| 2,852,033 | A | * 9/1958 | Orser | 137/115.26 |
| 4,823,844 | A | * 4/1989 | Bartholomew | 138/30 |
| 4,897,906 | A | * 2/1990 | Bartholomew | 29/890.09 |
| 5,348,458 | A | * 9/1994 | Pontiff | 425/4 R |
| 5,543,899 | A | * 8/1996 | Inami et al. | 399/176 |
| 6,613,811 | B1 | * 9/2003 | Pallaver et al. | 521/81 |
| 2003/0159743 | A1 | * 8/2003 | Kobayashi et al. | 138/30 |

FOREIGN PATENT DOCUMENTS

| | | |
|---|---|---|
| EP | 1172599 A2 * | 1/2002 |
| JP | 58-50590 | 11/1983 |
| JP | 61-60202 | 12/1986 |
| JP | 62-97400 | 6/1987 |
| JP | 39-15931 | 8/1989 |
| JP | 3-186691 | 8/1991 |
| JP | 3-91597 | 9/1991 |
| JP | 4-3194 | 1/1992 |
| JP | 4-22170 | 4/1992 |
| JP | 4-58494 | 9/1992 |
| JP | 3020335 | 11/1995 |
| JP | 8-18391 | 2/1996 |
| JP | 2521837 | 5/1996 |
| JP | 8-145271 | 6/1996 |
| JP | 8-177092 | 7/1996 |
| JP | 8-326986 | 12/1996 |
| JP | 9-152057 | 6/1997 |
| JP | 9-303667 | 11/1997 |
| JP | 2908998 | 4/1999 |
| JP | 11-118066 | 4/1999 |
| JP | 11-201368 | 7/1999 |
| JP | 2973847 | 9/1999 |
| JP | 2000-6160 | 1/2000 |

* cited by examiner

Primary Examiner—James Hook
(74) Attorney, Agent, or Firm—McGinn & Gibb, PLLC

(57) ABSTRACT

A liquid hammer prevention device has a casing led to a fluid channel via passage hole, an elastic cushion made of foamed material incorporated in the casing; and a diaphragm partitioning the inside of the into an area led to the fluid channel and another area incorporating the elastic cushion. The elastic cushion is "Asker C 30 and 85" according to Japanese Industrial Standard S 6050 measured by the level gauge of a durometer "Asker C," and is 0.30–0.70 of apparent specific gravity.

24 Claims, 23 Drawing Sheets

LIQUID HAMMER PREVENTION DEVICE

BACKGROUND OF THE INVENTION

1. Field of the Invention

The present invention relates to a device for preventing liquid hammer. More particularly, the present invention relates to a device for preventing water hammer or fluid hammer which may occur inside a water pipe, or in a fluid channel of a hydraulic apparatus or other water related apparatus.

2. Description of the Related Art

There have been several types of liquid hammer prevention device (arrestor) in conventional and popular style, for example known as "water hammer arrestor," which effectively reduce liquid hammer occurring in a fluid channel such as inside a water pipe. The conventional liquid hammer prevention device may be roughly classified into two types, that is, an external attachment type connected at any intermediate position of the fluid channel, and a built-in type incorporated in an operation handle or the like which controls open/close of the fluid channel.

Further, the conventional liquid hammer prevention device may also be classified into other two groups, that is, an outer flange type in which an outer rim of a diaphragm is supported by an outer flange, and an inner flange type in which an outer rim of a diaphragm is supported by an inner flange. The fundamental structure of outer flange type of liquid hammer prevention device mentioned above, serving to effectively absorb and reduce the liquid hammer, is illustrated in FIG. 26. There is a cylindrical form of elastic cushion K of which outer diameter D and height H are substantially identical with each other, incorporated in a casing K0 of a liquid hammer prevention device 700. There is a hat-shape of diaphragm C comprising a stretch portion C1 and an outer rim C2, positioned at the exposed surface (i.e. not the surface being in touch with the casing K0) of the elastic cushion K. The outer rim C2 is in contact with the upper surface of a flange C3 and pressed down by the outer flange of the casing K0 by means of caulking at around the caulking means 725, thus the elastic cushion K is sealed. Further, the elastic cushion K incorporated in the casing K0 is attached to a pipe P1 via a mounting screw portion C4 of the flange C3. As illustrated in FIG. 27, the diaphragm C is a hat-shape diaphragm having the stretch portion C1 so that the stretch portion C1 may follow the displacement of the elastic cushion K by a considerable large amount of L in the direction of the height H thereof, which occurs when the elastic cushion K receives a liquid hammer force P through a passage hole 701 and a certain volume of buffer space.

The reason for adopting the cylindrical shape for the liquid hammer prevention device 700 as above discussed is to secure more than a predetermined volume of the elastic cushion K in order to effectively serve the liquid hammer absorption function. To satisfy this requirement, it is necessary to provide the elastic cushion K with a predetermined hardness, and with the height allowing the compression displacement by a predetermined amount. In addition, since the liquid hammer prevention device 700 is in the cylindrical shape, the diaphragm C of the elastic cushion K may have the durability in order to prevent the exposed surface of the elastic cushion K from being hollowed due to liquid hammer force, and may also have the stretchability being able to follow the compression displacement of the elastic cushion K.

The above discussed elastic cushion K uses, as the material thereof, the elastic hollow spheres added type of silicone gel, comprising a silicone gel cushion K1 as the essential material of the elastic cushion K, and elastic hollow spheres K2 incorporated in the silicone gel cushion K1.

However, when the elastic hollow spheres added type of silicone gel discussed above repeatedly absorbs the liquid hammer force for a long period of time, the contact surface between the elastic hollow sphere K2 and the silicone gel cushion K1 would collapse or exfoliate, consequently it has been found that the long-term liquid hammer absorption effect cannot be guaranteed according to the above liquid hammer prevention device 700. This is so-called "softening" of the elastic hollow sphere added type of silicone gel, which softens the elastic hollow sphere added type of silicone gel when an external forth exceeding the predetermined amount is continuously applied to that silicone gel.

This softening would spread even to portion where the displacement of the elastic hollow sphere added type of silicone gel becomes in contact with the casing K0 due to liquid hammer force. Consequently, the softening would cause the so-called "bottom thrust" in which the liquid hammer absorption function cannot be guaranteed, thereby the pressure energy conversion efficiency would be seriously reduced due to decrease of modulus of impact resilience.

The bottom thrust has been supposed to occur because of the softening of the whole body of elastic cushion due to multiple-stage factor. First, because of continuous compression displacement of the elastic hollow spheres K2, there occurs the exfoliation of elastic hollow spheres K2 out of the portion at which the silicone resin has been in contact with the elastic hollow spheres K2. Then, the exfoliation brings about the deterioration of external force transmission to the elastic hollow spheres K2, which eventually causes the softening of the whole body of the elastic cushion. Therefore, when using the silicone gel cushion K1, it has been necessary to secure the sufficient volume more than the predetermined amount, and the sufficient height allowing the compression displacement by the predetermined amount.

FIGS. 28 and 29 illustrate typical embodiments of the inner flange type of liquid hammer prevention device. A liquid hammer prevention device 800 of FIG. 28 is attached to any intermediate position of piping by means of a branch connection. The liquid hammer prevention device 800 has a main body 803 of which thread portion 803A is engaged with a thread portion 805B of a mounting ring 805, and the main body 803 is eventually led to a fluid channel through a passage hole 801, by means of engagement of a thread portion 805A of the mounting ring 805 with the fluid channel. A casing K0 is attached to and covers the outer periphery of the mounting ring 805 by engagement of a thread portion 805C of the mounting ring 805 with a thread portion 807 of the casing K0. There is formed an engagement groove 803E at the space between the mounting ring 805 and a head 803D of the main body 803 being inserted and placed inside the casing K0. A diaphragm C has an engagement protrusive portion C1 formed at the opening of diaphragm C and inwardly protruding in the radius direction thereof, and this engagement protrusive portion C1 is engaged with the engagement groove 803E. Thus the diaphragm C partitions the space inside the casing K0 into two areas, that is, an area S801 led to the fluid channel via the passage hole 801, and an area S802 provided for an elastic cushion 809 incorporated in the casing K0. The tightness of sealing of fluid between the areas S801 and S802 is maintained by means of the engagement protrusive portion C1 being caught toward the axis X by two elements, that is the head 803D and the mounting ring 805, on account of engagement of the thread portion 803A with the thread portion 805B.

Further, FIG. 29 illustrates another type of liquid hammer prevention device 900. This liquid hammer prevention device 900 is in a form of faucet handle, in which a water hammer arrestor unit is incorporated. In particular, the liquid hammer prevention device 900 is provided inside a handle 919 which controls open/close of a spindle 911. The spindle 911 comprises a thread portion 911A being engaged with an accepting female thread portion of a valve main body (not shown) and a valve element 913 positioned below. There is a passage hole 901 penetrating through the axis X of the spindle 911, and a thread portion of a main body 903 is in engagement with an accepting thread portion of the spindle 911 at the top thereof so that the fluid may not leak out of the space between the spindle 911 and the main body 903. The other structure is substantially the same as that of the liquid hammer prevention device 800. That is, there is a mounting ring 905 of which thread portion being engaged with an accepting thread portion 903N provided at an outer periphery 903B of the main body 903, and a casing K0 serving as the handle 919 is attached to and covers the mounting ring 905 by engagement of a thread portion 905C of the mounting ring 905 with an accepting thread portion 907 of the casing K0.

There is formed an engagement groove 903E at the space between the mounting ring 905 and a head 903D of the main body 903 being inserted and placed inside the casing K0. A diaphragm C has an engagement protrusive portion C1 formed at the opening of diaphragm C and inwardly protruding in the radius direction thereof, and this engagement protrusive portion C1 is engaged with the engagement groove 903E. Thus the diaphragm C partitions the space inside the casing K0 into two areas, that is, an area S901 led to the fluid channel via the passage hole 901, and an area S902 provided for an elastic cushion 909 incorporated in the casing K0. The tightness of sealing of fluid between the areas S901 and S902 is maintained by means of the engagement protrusive portion C1 being caught toward the axis X by two elements, that is the head 903D and the mounting ring 905, on account of engagement of the thread portion 903N with the thread portion 905B.

The inner flange type of liquid hammer prevention device as above discussed is required to secure the performance that the elastic cushion material can maintain the liquid hammer prevention function for a long time, and to secure the sufficient tightness of liquid sealing of the diaphragm so that the fluid may not leak out of the connecting part between the diaphragm and the casing, which would cause intrusion of fluid into the casing space incorporating the elastic cushion. If the fluid leaks and intrudes into the inner space of the casing, the elastic cushion will become put in the fluid, in other words, the elastic cushion will become floating in the fluid. Eventually, the liquid hammer force is received by the whole surface of the elastic cushion at the same time, thus the effective energy conversion cannot be carried out. Further, when the fluid intrudes into the space between the elastic cushion and the diaphragm and thereby the layer of fluid is formed, the pressure energy of liquid hammer cannot be transmitted to the elastic cushion effectively, thus the effective energy conversion cannot be carried out, and also the effective absorption and reduction of the liquid hammer cannot be carried out. In addition, the prevention of leakage of fluid out of the casing is also required in order to maintain the good condition of the device itself.

The fastening of the diaphragm in order to secure the tightness of fluid sealing of the liquid hammer prevention device as above discussed is carried out by fastening the thread between the mounting ring and the head of the main body. This causes the increase of number of parts as well as the number of working or assembly steps. Consequently, there arises the economic problem that the production cost of liquid hammer prevention device would become higher, and also the technical problem that the stable product quality cannot be maintained due to unevenness of the fastening force might be applied to the thread parts during assembly of the liquid hammer prevention device.

SUMMARY OF THE INVENTION

Therefore, the inventors focused on the problems arisen from the conventional type of liquid hammer prevention device as above discussed. It is a first object of the present invention to provide a liquid hammer prevention device which may effectively maintain the liquid hammer prevention function for a long time. Further, it is a second object of the present invention to provide a liquid hammer prevention device which, in addition to the first object of the present invention to effectively maintain the liquid hammer prevention function for a long time, is provided with the superior performance of liquid sealing tightness, as well as with the simple maintenance structure, so that the stable product quality and the lower production cost may be accomplished.

To achieve the objects mentioned above, according to claim 1 of the present invention, there is provided a liquid hammer prevention device comprising a casing led to a fluid channel via passage hole; an elastic cushion incorporated in the casing; and a diaphragm partitioning the inside of the casing into an area led to the fluid channel and another area incorporating the elastic cushion, wherein the elastic cushion is a foamed material of which initial hardness is "Asker C 30–85" according to JIS (Japanese Industrial Standard) S 6050 measured by the level gauge of a durometer "Asker C" manufactured by Kobunshi Keiki Co., Ltd. of Kyoto, Japan (hereinafter referred to as "Asker C"), and of which apparent specific gravity is 0.30–0.70.

According to claim 2 of the present invention, there is provided a liquid hammer prevention device comprising: a casing led to a fluid channel via passage hole; an elastic cushion incorporated in the casing; and a diaphragm partitioning the inside of the casing into an area led to the fluid channel and another area incorporating the elastic cushion, wherein the elastic cushion is a foamed material of which initial hardness is "Asker C 50–85," and of which apparent specific gravity is 0.30–0.40.

According to claim 3 of the present invention, there is provided a liquid hammer prevention device comprising: a casing led to a fluid channel via passage hole; an elastic cushion incorporated in the casing; and a diaphragm partitioning the inside of the casing into an area led to the fluid channel and another area incorporating the elastic cushion, wherein the elastic cushion is a foamed material of which initial hardness is "Asker C 55–70," and of which apparent specific gravity is 0.30–0.40.

According to claim 4 of the present invention, there is provided the liquid hammer prevention device as claimed in claim 1, wherein, the elastic cushion is a low-profile shape having small height and large diameter; the diaphragm is in a flat plate shape of which diameter being larger than the diameter of the elastic cushion; and an outer rim of the diaphragm is supported by an inner wall of the casing.

According to claim 5 of the present invention, there is provided the liquid hammer prevention device as claimed in claim 2, wherein, the elastic cushion is a low-profile shape having small height and large diameter; the diaphragm is in a flat plate shape of which diameter being larger than the diameter of the elastic cushion; and an outer rim of the diaphragm is supported by an inner wall of the casing.

According to claim 6 of the present invention, there is provided the liquid hammer prevention device as claimed in claim 3, wherein, the elastic cushion is a low-profile shape having small height and large diameter; the diaphragm is in a flat plate shape of which diameter being larger than the diameter of the elastic cushion; and an outer rim of the diaphragm is supported by an inner wall of the casing.

According to claim 7 of the present invention, there is provided the liquid hammer prevention device as claimed in claim 1, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the diaphragm is provided with a protrusive portion protruding in the outward radius direction of which width in the radius direction between an inner peripheral surface and an outer peripheral surface of the engagement protrusive portion being not less than the width in the radius direction between a side wall peripheral surface and the inner wall of the casing.

According to claim 8 of the present invention, there is provided the liquid hammer prevention device as claimed in claim 2, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the diaphragm is provided with a protrusive portion protruding in the outward radius direction of which width in the radius direction between an inner peripheral surface and an outer peripheral surface of the engagement protrusive portion being not less than the width in the radius direction between a side wall peripheral surface and the inner wall of the casing.

According to claim 9 of the present invention, there is provided the liquid hammer prevention device as claimed in claim 3, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the diaphragm is provided with a protrusive portion protruding in the outward radius direction of which width in the radius direction between an inner peripheral surface and an outer peripheral surface of the engagement protrusive portion being not less than the width in the radius direction between a side wall peripheral surface and the inner wall of the casing.

According to claim 10 of the present invention, there is provided the liquid hammer prevention device as claimed in claim 1, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the main body is provided on a side wall peripheral surface of the engagement groove with a projective portion projecting in the outward radius direction.

According to claim 11 of the present invention, there is provided the liquid hammer prevention device as claimed in claim 2, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the main body is provided on a side wall peripheral surface of the engagement groove with a projective portion projecting in the outward radius direction.

According to claim 12 of the present invention, there is provided the liquid hammer prevention device as claimed in claim 3, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the main body is provided on a side wall peripheral surface of the engagement groove with a projective portion projecting in the outward radius direction.

According to claim 13 of the present invention, there is provided the liquid hammer prevention device as claimed in claim 1, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body , thereby the engagement protrusive portion being secured to and fixed on the engagement groove and an inner wall of the casing, wherein, the diaphragm is provided with a protrusive portion protruding in the outward radius direction of which width in the radius direction between an inner peripheral surface and an outer peripheral surface of the engagement protrusive portion being not less than the width in the radius direction between a side wall peripheral surface and the inner wall of the casing, and the main body is provided on a side wall peripheral surface of the engagement groove with a projective portion projecting in the outward radius direction.

According to claim 14 of the present invention, there is provided the liquid hammer prevention device as claimed in claim 2, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the diaphragm is provided with a protrusive portion protruding in the outward radius direction of which width in the radius direction between an inner peripheral surface and an outer peripheral surface of the engagement protrusive portion being not less than the width in the radius direction between a side wall peripheral surface and the inner wall of the casing, and the main body is provided on a side wall peripheral surface of the engagement groove with a projective portion projecting in the outward radius direction.

According to claim 15 of the present invention, there is provided the liquid hammer prevention device as claimed in claim 3, comprising: a casing; an elastic cushion incorporated in the casing; a main body positioned inside the casing and having a passage hole led to a fluid channel; and a diaphragm having at the opening rim an engagement protrusive portion protruding in the inward radius direction and being engaged with an engagement groove formed at a head of the main body, thereby the engagement protrusive portion being secured to and fixed on the engagement groove and an inner wall of the casing, wherein, the diaphragm is provided with a protrusive portion protruding in the outward radius direction of which width in the radius direction between an inner peripheral surface and an outer peripheral surface of the engagement protrusive portion being not less than the width in the radius direction between a side wall peripheral surface and the inner wall of the casing, and the main body is provided on a side wall peripheral surface of the engagement groove with a projective portion projecting in the outward radius direction.

According to claim 16 of the present invention, there is provided the liquid hammer prevention device as claimed in claim 7, wherein the diaphragm is provided at the bottom of the engagement protrusive portion with a thin lip portion protruding in the inward radius direction being in tight contact by liquid pressure function with a lower surface of the engagement groove.

According to claim 17 of the present invention, there is provided the liquid hammer prevention device as claimed in claim 8, wherein the diaphragm is provided at the bottom of the engagement protrusive portion with a thin lip portion protruding in the inward radius direction being in tight contact by liquid pressure function with a lower surface of the engagement groove.

According to claim 18 of the present invention, there is provided the liquid hammer prevention device as claimed in claim 9, wherein the diaphragm is provided at the bottom of the engagement protrusive portion with a thin lip portion protruding in the inward radius direction being in tight contact by liquid pressure function with a lower surface of the engagement groove.

According to claim 19 of the present invention, there is provided the liquid hammer prevention device as claimed in claim 10, wherein the diaphragm is provided at the bottom of the engagement protrusive portion with a thin lip portion protruding in the inward radius direction being in tight contact by liquid pressure function with a lower surface of the engagement groove.

According to claim 20 of the present invention, there is provided the liquid hammer prevention device as claimed in claim 11, wherein the diaphragm is provided at the bottom of the engagement protrusive portion with a thin lip portion protruding in the inward radius direction being in tight contact by liquid pressure function with a lower surface of the engagement groove.

According to claim 21 of the present invention, there is provided the liquid hammer prevention device as claimed in claim 12, wherein the diaphragm is provided at the bottom of the engagement protrusive portion with a thin lip portion protruding in the inward radius direction being in tight contact by liquid pressure function with a lower surface of the engagement groove.

According to claim 22 of the present invention, there is provided the liquid hammer prevention device as claimed in claim 13, wherein the diaphragm is provided at the bottom of the engagement protrusive portion with a thin lip portion protruding in the inward radius direction being in tight contact by liquid pressure function with a lower surface of the engagement groove.

According to claim 23 of the present invention, there is provided the liquid hammer prevention device as claimed in claim 14, wherein the diaphragm is provided at the bottom of the engagement protrusive portion with a thin lip portion protruding in the inward radius direction being in tight contact by liquid pressure function with a lower surface of the engagement groove.

According to claim 24 of the present invention, there is provided the liquid hammer prevention device as claimed in claim 15, wherein the diaphragm is provided at the bottom of the engagement protrusive portion with a thin lip portion protruding in the inward radius direction being in tight contact by liquid pressure function with a lower surface of the engagement groove.

With this structure, according to the liquid hammer prevention device of claim 1, the elastic cushion is made of the foamed material of which initial hardness is "Asker C 30–85" and apparent specific gravity is 0.30–0.70. This elastic material has uncountable isolated fine cells, and can serve as the pressure energy conversion medium by securing the displacement amount from uncountable isolated fine elastic cells as well as by the energy loss due to the inner friction (viscoelasticity characteristic). Further, since the polyurethane elastomer is polymer, but not a composite of different materials and fillers, the hardness results from the molecular structure of the polymer, this material can be formulated and foamed at an arbitrary high-hardness level with excellent mechanical strength, damping properties, good durability because of good compression set and repeated compression characteristics. Consequently, this material may maintain the energy absorption and damping performance against the liquid hammer for a long time. Further, this material may be formed into any shape at will, which may contribute to the downsize of products.

According to the liquid hammer prevention device of claim 2, the elastic cushion is made of the foamed material of which initial hardness is "Asker C 50–85" and apparent specific gravity is 0.30–0.40. This elastic material can serve as the pressure energy conversion medium by securing the displacement amount from uncountable isolated fine elastic cells as well as by the energy loss due to the inner friction (viscoelasticity characteristic). Further, this material can be formulated and foamed at an arbitrary high-hardness level with excellent mechanical strength, damping properties, good durability because of good compression set and repeated compression characteristics. This material may maintain the energy absorption and damping performance against the liquid hammer for a long time even under the severe condition of high temperature and high pressure. Further, this material may be formed into any shape at will, which may contribute to the downsize of products.

According to the liquid hammer prevention device of claim 3, the elastic cushion is made of the foamed material of which initial hardness is "Asker C 55–70" and apparent specific gravity is 0.30–0.40. This elastic material can serve as the pressure energy conversion medium by securing the displacement amount from uncountable isolated fine elastic cells as well as by the energy loss due to the inner friction (viscoelasticity characteristic). Further, this material can be formulated and foamed at an arbitrary high-hardness level with excellent mechanical strength, damping properties, good durability because of good compression set and repeated compression characteristics. This material may maintain the energy absorption and damping performance against the liquid hammer for a long time even under the severe condition of high temperature and high pressure. Further, this material may be formed into any shape at will, which may contribute to the downsize of products.

According to the liquid hammer prevention device of claims 4 through 6, the foamed material as above discussed is adopted as the elastic cushion in low-profile and large-diameter, and the diaphragm is in the thin and flat plate shape of which diameter is larger than that of the elastic cushion. Thus the overall height of the elastic cushion and the diaphragm can be lowered. Consequently, the liquid hammer prevention device may become low-profile allowing the downsizing structure. Further, the liquid hammer prevention device may be easily installed in any narrow space of water or liquid related instruments.

According to the liquid hammer prevention device of claims 7 through 9, the engagement groove provided at the head of the main body positioned inside the casing is engaged with the engagement protrusive portion, formed at the opening rim of the diaphragm protruding in the inward radius direction. The diaphragm is fixed on and secured to the space between the casing and the main body, by engagement of the engagement protrusive portion with the engagement groove of the main body and with the inner wall of the casing. Thus the diaphragm partitions the space inside the casing into two areas, that is, the area led to the fluid channel via the passage hole, and the area provided for the elastic cushion incorporated in the casing. The engagement protrusive portion of the diaphragm has protrusive portions outwardly protruding in the radius direction, provided on an outer peripheral surface. The width in the radius direction between the inner peripheral surface and the outer peripheral surface of the engagement protrusive portion, is not less than the width in the radius direction between the side wall peripheral surface of the engagement groove and the inner wall of the casing. Consequently, the outer peripheral surface of the engagement protrusive portion is pressed by the inner wall of the casing, thereby the engagement protrusive portion is deformed expanding both in the inward radius direction and the outward radius direction. Further, both the top and the bottom of the engagement protrusive portion are also deformed expanding in the axial direction. Accordingly, the inner peripheral surface of the engagement protrusive portion is pressed by the side wall peripheral surface of the engagement groove, thereby each of the areas is tightly sealed.

With this structure, there is no possibility of intrusion of fluid, from the area led to the fluid channel via the passage hole, into the other area inside the casing in which the elastic cushion is incorporated, thus the floating of elastic cushion in the fluid, or the situation of not being able to efficiently convert the energy due to generation of layer of liquid between the elastic cushion and the diaphragm will not occur, so the excellent performance serving as the liquid hammer prevention device can be maintained for a long time. Further, there is no possibility of leakage of fluid out of the casing, so the good condition of the device itself can be maintained. The engagement groove provided at the head of the main body is engaged with the engagement protrusive portion, formed at the opening rim of the diaphragm protruding in the inward radius direction. In addition, the diaphragm is fixed on and secured to the space between the casing and the main body, by engagement of the engagement protrusive portion with the engagement groove of the main body, and with the inner wall of the casing. Therefore, the liquid hammer prevention device according to the present invention requires less number of assembly parts as well as less number of assembly working steps. So the liquid hammer prevention device may be manufactured at the lower cost, maintaining the uniformity of product quality at the same time.

According to the liquid hammer prevention device of claims 10 through 12, the engagement groove provided at the head of the main body inserted in the casing is engaged with the engagement protrusive portion, formed at the opening rim of the diaphragm protruding in the inward radius direction. Thus the diaphragm partitions the space inside the casing into two areas, that is, the area led to the fluid channel via the passage hole, and the area provided for the elastic cushion incorporated in the casing. The protrusive portions provided on the side wall peripheral surface of the engagement groove is caught and incorporated by the inner peripheral surface of the engagement protrusive portion of the diaphragm, thereby the engagement protrusive portion of the diaphragm is deformed expanding in the radius direction and in the axial direction. Accordingly, the outer peripheral surface of the engagement protrusive portion is pressed by the side wall of the casing, and the inner peripheral surface of the engagement protrusive portion is strongly pressed by the protrusive portions by the reaction force. Further, both the top and the bottom of the engagement protrusive portion are also deformed expanding in the axial direction, thereby each of the areas is tightly sealed.

With this structure, there is no possibility of intrusion of fluid, from the area led to the fluid channel via the passage hole, into the other area inside the casing in which the elastic cushion is incorporated, thus the floating of elastic cushion in the fluid, or the situation of not being able to efficiently convert the energy due to generation of layer of liquid between the elastic cushion and the diaphragm will not occur, so the excellent performance serving as the liquid hammer prevention device can be maintained for a long time. Further, there is no possibility of leakage of fluid out of the casing, so the good condition of the device itself can be maintained. The engagement groove provided at the head of the main body is engaged with the engagement protrusive portion, formed at the opening rim of the diaphragm protruding in the inward radius direction. In addition, the diaphragm is fixed on and secured to the space between the casing and the main body, by engagement of the engagement protrusive portion with the engagement groove of the main body, and with the inner wall of the casing. Therefore, the liquid hammer prevention device according to the present invention requires less number of assembly parts as well as less number of assembly working steps. So the liquid hammer prevention device may be manufactured at the lower cost, maintaining the uniformity of product quality at the same time.

According to the liquid hammer prevention device of claims 13 through 15, the engagement groove provided at the head of the main body positioned inside the casing is engaged with the engagement protrusive portion, formed at the opening rim of the diaphragm protruding in the inward radius direction. The diaphragm is fixed on and secured to the space between the casing and the main body, by engagement of the engagement protrusive portion with the engagement groove of the main body and with the inner wall of the casing. Thus the diaphragm partitions the space inside the casing into two areas, that is, the area led to the fluid channel via the passage hole, and the area provided for the elastic cushion incorporated in the casing. The width in the radius direction between the inner peripheral surface and the outer peripheral surface of the engagement protrusive portion is not less than the width in the radius direction between the side wall peripheral surface of the engagement groove and the inner wall of the casing. Consequently, the outer peripheral surface of the engagement protrusive portion is pressed by the inner wall of the casing, thereby the engagement protrusive portion is deformed expanding both in the inward and outward radius directions, and the inner peripheral surface of the engagement protrusive portion is pressed by the outer peripheral surface of the engagement groove. Further, the protrusive portions are caught by the inner peripheral surface of the engagement protrusive surface, thus the engagement protrusive portion is further deformed expanding in the radius and axial directions. Accordingly, the outer peripheral surface of the engagement protrusive portion is strongly pressed by the inner wall of the casing, and because of the reaction force generated thereby, the inner peripheral surface of the engagement protrusive portion is strongly pressed by the protrusive portions, thereby each of the areas is tightly sealed.

With this structure, there is no possibility of intrusion of fluid, from the area led to the fluid channel via the passage hole, into the other area inside the casing in which the elastic cushion is incorporated, thus the floating of elastic cushion in the fluid, or the situation of not being able to efficiently convert the energy due to generation of layer of liquid between the elastic cushion and the diaphragm will not occur, so the excellent performance serving as the liquid hammer prevention device can be maintained for a long time. Further, there is no possibility of leakage of fluid out of the casing, so the good condition of the device itself can be maintained. The engagement groove provided at the head of the main body is engaged with the engagement protrusive portion, formed at the opening rim of the diaphragm protruding in the inward radius direction. In addition, the diaphragm is fixed on and secured to the space between the casing and the main body, by engagement of the engagement protrusive portion with the engagement groove of the main body, and with the inner wall of the casing. Therefore, the liquid hammer prevention device according to the present invention requires less number of assembly parts as well as less number of assembly working steps. So the liquid hammer prevention device may be manufactured at the lower cost, maintaining the uniformity of product quality at the same time.

According to the liquid hammer prevention device of claims 16 through 24,there is the thin lip portion formed in the inward radius direction at the lower part of the engagement protrusive portion. If by some accident the liquid intrudes into the engagement groove, since the lip portion becomes in close contact with the lower portion of the engagement groove due to the force in the direction of liquid pressure, the tight liquid sealing performance is accomplished.

With this structure, there is no possibility of intrusion of fluid, from the area led to the fluid channel via the passage hole, into the other area inside the casing in which the elastic cushion is incorporated, thus the floating of elastic cushion in the fluid, or the situation of not being able to efficiently convert the energy due to generation of layer of liquid between the elastic cushion and the diaphragm will not occur, so the excellent performance serving as the liquid hammer prevention device can be maintained for a long time. Further, there is no possibility of leakage of fluid out of the casing, so the good condition of the device itself can be maintained. The engagement groove provided at the head of the main body is engaged with the engagement protrusive portion, formed at the opening rim of the diaphragm protruding in the inward radius direction. In addition, the diaphragm is fixed on and secured to the space between the casing and the main body, by engagement of the engagement protrusive portion with the engagement groove of the main body, and with the inner wall of the casing. Therefore, the liquid hammer prevention device according to the present invention requires less number of assembly parts as well as less number of assembly working steps. So the liquid hammer prevention device may be manufactured at the lower cost, maintaining the uniformity of product quality at the same time.

BRIEF DESCRIPTION OF THE DRAWINGS

The invention will be described below in detail with reference to the accompanying drawings, in which.

DETAILED DESCRIPTION OF THE INVENTION

Now several embodiments of the present invention will be described with reference to the accompanied Figures. FIGS. 1 through 6 illustrate six embodiments of liquid hammer prevention device, in which the present invention is applied to a tall type of water hammer arrestor "MW2" developed by the applicant in the prior art. FIGS. 8 through 12 show the experimental results of the liquid hammer prevention devices according these embodiments. Also, FIGS. 13 through 18 illustrate low-profile type of liquid hammer prevention devices to which the present invention is applied.

Figure 1:
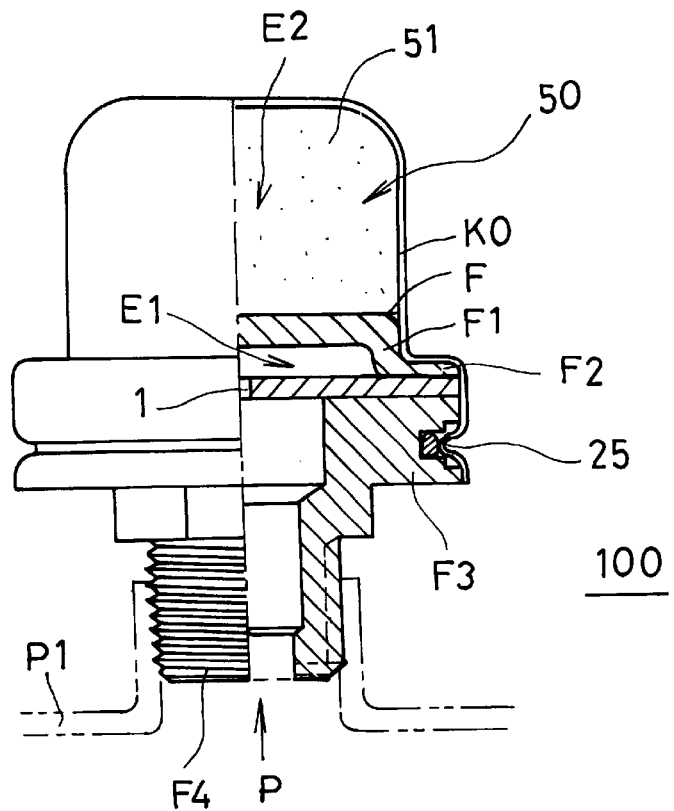
FIG. 1 is a sectional view of a liquid hammer prevention device according to a first embodiment of the present invention.

A first embodiment of the present invention will now be described with reference to FIG. 1, in which a liquid hammer prevention device 100 has a tall shape just like the water hammer arrestor MW2 developed by the applicant. The liquid hammer prevention device 100 has a casing K0, in which an elastic cushion 50 is contained. The elastic cushion 50 is in a cylindrical shape, of which outer peripheral diameter is substantially the same as the height thereof. There is a hat-shape of diaphragm F positioned at the exposed surface (i.e. not the surface being in touch with the casing K0) of the elastic cushion 50. The outer rim F2 is in contact with the upper surface of an outer flange F3 and pressed down by the outer flange of the casing K0 by means of caulking at around the caulking means 25, thus the elastic cushion 50 is sealed.

The diaphragm F is a hat-shape diaphragm having the stretch portion F1 so that the stretch portion F1 may follow the displacement of the elastic cushion 50 by a considerable large amount in the direction of the height thereof, which occurs when the elastic cushion 50 receives a liquid hammer force P through a passage hole 1 and a certain volume of buffer space. Further, the elastic cushion 50 incorporated in the casing K0 is attached to a pipe P via a mounting screw portion F4 of the outer flange F3, thus the liquid hammer protection device 100 provides the casing K0 led to the fluid channel via the passage hole 1. The space inside the casing K0 is partitioned into two areas by the diaphragm, that is, an area E1 led to the fluid channel, and an area E2 provided for incorporating the elastic cushion 50.

The elastic cushion 50 and the diaphragm F are led to the fluid channel via the passage hole 1. The passage hole 1 serves as an orifice, so that the pressure energy conversion efficiency of the elastic cushion 50 of which volume being restricted may be supported by the pressure reduction effect and the frequency conversion (phase shifting) function of the passage hole 1. In the present embodiment, the passage hole 1 is positioned relatively close to the elastic cushion 50 and the diaphragm F, and the preferable aperture of the passage hole 1 is approximately 3 mm, though the actual size should be determined according to the specification of elastic cushion 50, piping diameter, etc.

The material used for the elastic cushion 50 incorporated in the liquid hammer prevention device 100 as above discussed will be a foamed material 51, of which initial hardness amounts to "Asker C" 30–85 according to JIS (Japanese Industrial Standard) S 6050 measured by the level gauge of a durometer (rubber hardness tester) "Asker C" manufactured by Kobunshi Keiki Co., Ltd. of Kyoto, Japan (hereinafter referred to, for example, as "Asker C 30–85"), and the apparent specific gravity is 0.30–0.70. In fact, the most preferable result was obtained when the foamed material 51 having the initial hardness around "Asker C 55–70" and the apparent specific gravity around 0.30–0.40 was used for the elastic cushion 50, but the good result was still able to be obtained even when the mass-production type of foamed material was used, of which initial hardness was "Asker C 50–85" and apparent specific gravity was 0.30–0.40, in order to reduce the production cost. The foamed material 51 may be made of various types of polymer such as polypropylene, polyethylene, in this case for example, polyurethane fine foamed material was used for the foamed material 51. The appropriate polyurethane fine foamed material 51 is available among the products of Nisshinbo Industries, Inc., of Tokyo, Japan, named "Dumplon ES 202" or "Dumplon ES 206," by selecting the one falling under the range of initial hardness and apparent specific gravity as above discussed. The polyurethane fine foamed material 51 has been obtained by pouring the resin falling under the above mentioned range into a mold so that the resin may start foaming and form the sheet shape of polyurethane fine foamed material 51. At that time, since the gas would go out of the outer surface of the foamed material 51, each foam particle near the surface area becomes rather coarse, of which diameter is about 300–400 $\mu$m. On the other hand, in the inner part of the foamed material 51, since the gas cannot go out and remains inside, each foam particle becomes fine, of which diameter is about 50–100 μm. The material of diaphragm F will be high-strength millable (heat vulcanizing) silicone rubber.

The polyurethane fine foamed material 51 serving as the elastic cushion is a kind of polyurethane foam, having uncountable fine isolated foams. This foamed material 51 may be classified in semi-hard material, but among the semi-hard materials, this is a harder type material. This foamed material 51 is manufactured by utilizing the gas generated when glycol element and diisocyanate element are reacted by means of water. When this reaction occurs, the glycol element and the diisocyanate element form the network structure by bridged bound, and at that time, the above gas is generated, which is then used for foaming of the polyurethane fine foamed material 51. Although there are several types of polyurethane fine foamed material, the one having excellent damping and shock absorption performance and durability, such as that having good reputation as a railroad damper material, could be selected for the polyurethane fine foamed material 51, since such a railroad damper material would be used, for example, for elastic damper under the railroad ties exposed in tough weather condition and bound by heavy load for a long time.

There are prior arts disclosing the manufacturing method of the polyurethane fine foamed material 51, as the manufacturing method of high-density cellular core urethane elastomer for elastic damper under the railroad ties. Those prior arts have been disclosed in Japanese Patent Examined Publications Nos. Sho 58-50590, Sho 61-60202, Hei 4-22170, Hei 4-58494 and Hei 8-18391, and Japanese Patents Nos. 2521837 and 2973847.

The most preferable type used for the polyurethane fine foamed material 51 will be "Dumplon ES 202" manufactured by Nisshinbo Industries, Inc., as above mentioned, especially for that of which initial hardness is "Asker C 55–70" and apparent specific gravity is 0.30–0.40. The specifications and the mechanical characteristics of this foamed material "Dumplon ES 202" and those of the other type of foamed material "Dumplon ES 206" (of which initial hardness is "Asker C 30–70, and apparent specific gravity is 0.60–0.70) will be shown in the table 1 below.

TABLE 1

| Items | | ES 202 | ES 206 | Remarks |
|---|---|---|---|---|
| Initial hardness | | 55–70 | 30–70 | Measurement by "Asker C" |
| (Apparent) specific gravity | | 0.3–0.4 | 0.6–0.7 | JIS Z 8807, foamed material |
| Compression set (set rate %) | | 4.7 | 6.1 | 1.5 kN, 70° C., 22 hours 26 × 26 × 15 mm |
| Tensile | strength (MPa) | 4.5 | 1.9 | JIS K 6301 |
| | expansion (%) | 200 | 382 | Dumbbell Specimen #3, 3 mmt |
| Tensile characteristic (kN/m) | | 14.9 | 9.4 | JIS K 6301, type B |
| Fatigue strength (set rate %) | | 0.7 | 1.9 | 2 ± 1 mm, 5 Hz, 1,000,000 times 50 × 50 × 15 mm |
| Heat resistance | (MPa) | 4.2 | 2.2 | JIS K 6301, 70° C., 96 hours |
| | (%) | 206 | 480 | |
| Water resistance | (MPa) | 3.7 | 1.5 | JIS K 6301, 50° C., 96 hours |
| | (%) | 202 | 393 | Ion exchange water |
| Alkali resistance | (MPa) | 3.9 | 1.7 | JIS K 6301, 50° C., 96 hours |

TABLE 1-continued

| Items | | ES 202 | ES 206 | Remarks |
|---|---|---|---|---|
| | (%) | 187 | 410 | Ca(OH)$_2$ saturated solution |
| Oil resistance | (MPa) | 3.0 | 1.6 | JIS K 6301, 50° C., 96 hours |
| | (%) | 183 | 337 | Lubrication oil ISO VG-30 |

As shown in the Table 1 above, the polyurethane fine foamed material 51, of which initial hardness is "Asker C 55–70" and apparent specific gravity is 0.30–0.40, can serve as the pressure energy conversion medium by securing the displacement amount from uncountable isolated fine elastic cells as well as by the energy loss due to the inner friction (viscoelasticity characteristic). Further, since the polyurethane fine foamed material 51 is polymer, but not a composite of different materials and fillers, the hardness results from the molecular structure of the polymer, thus the polyurethane fine foamed material 51 can be formulated and foamed at an arbitrary high-hardness level with excellent mechanical strength, damping properties, good durability because of good compression set and repeated compression characteristics. Consequently, the polyurethane fine foamed material 51 may maintain the energy absorption and damping performance against the liquid hammer for a long time. Further, the polyurethane fine foamed material 51 may be formed into any shape at will, which may contribute to the downsize of products. Even in the low-cost and mass production type of polyurethane fine foamed material of which initial hardness is "Asker C 50–85" and apparent specific gravity is 0.30–0.40, almost the same performance as above described has been confirmed.

Figure 2:
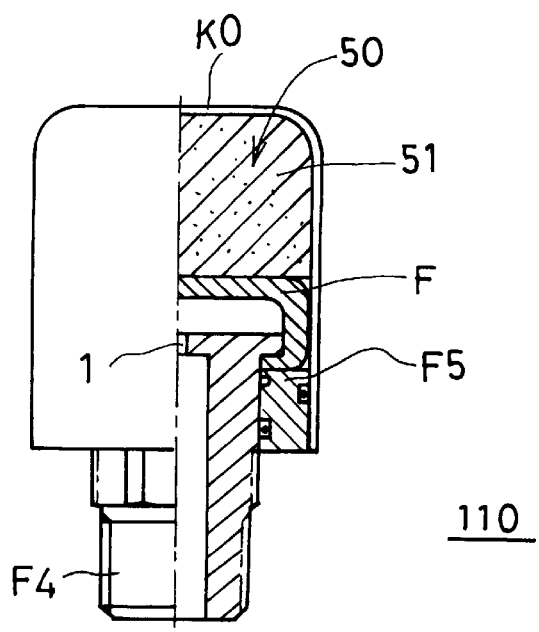
FIG. 2 is a sectional view of a liquid hammer prevention device according to a second embodiment of the present invention.

A second embodiment of the present invention will be described with reference to FIG. 2, showing a liquid hammer prevention device 110. The liquid hammer prevention device 110 is provided with a polyurethane fine foamed material 51, of which initial hardness is "Asker C 30–85" and apparent specific gravity is 0.30–0.70, wherein, as illustrated in the sectional view of FIG. 2, a diaphragm F is secured to an inner flange F5. The other structure is substantially the same as that of the liquid hammer prevention device 100 of the first embodiment as above discussed, thus the detailed explanation will not be done here.

Figure 3:
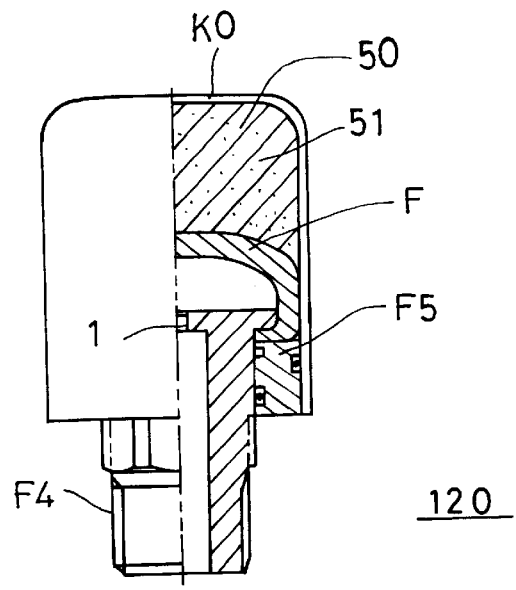
FIG. 3 is a sectional view of a liquid hammer prevention device according to a third embodiment of the present invention.

A third embodiment of the present invention will be described with reference to FIG. 3, showing a liquid hammer prevention device 120. The liquid hammer prevention device 120 is provided with a polyurethane fine foamed material 51, of which initial hardness is "Asker C 30–85" and apparent specific gravity is 0.30–0.70, wherein, as illustrated in the sectional view of FIG. 3, a diaphragm F is taller than that of liquid hammer prevention device 100 of the first embodiment, just like the shape of trap for catching octopus. The other structure is substantially the same as that of the liquid hammer prevention device 100 of the first embodiment as above discussed, thus the detailed explanation will not be done here.

Figure 4:
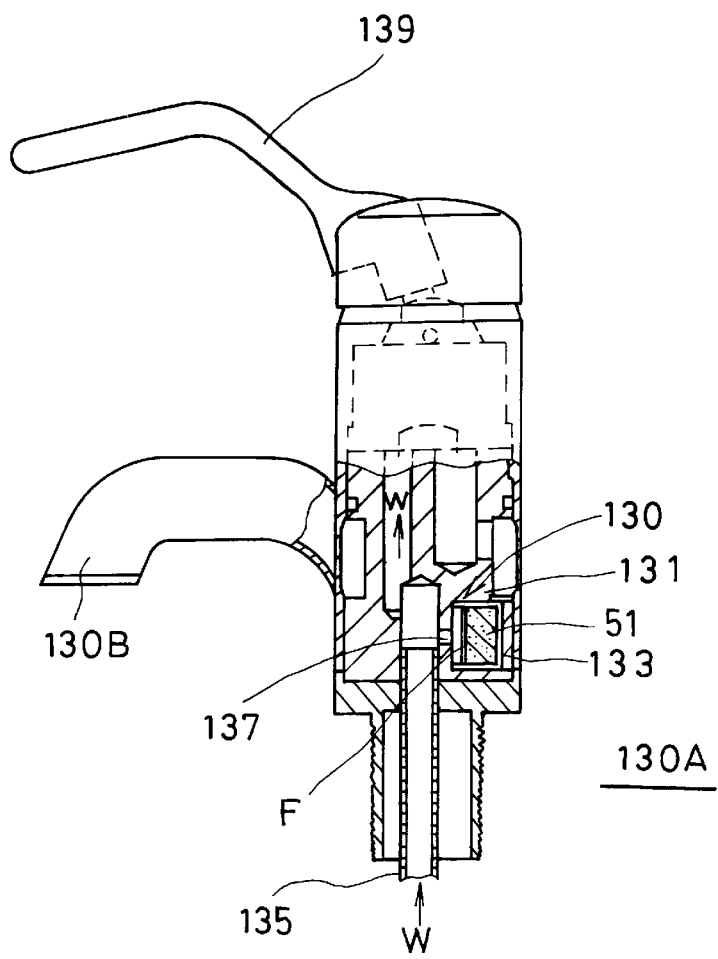
FIG. 4 is a sectional view of a liquid hammer prevention device according to a fourth embodiment of the present invention.

A fourth embodiment of the present invention will be described with reference to FIG. 4, showing a liquid hammer prevention device 130. The small size of liquid hammer prevention device 130 is incorporated in a single lever type of faucet 130A. The faucet 130A is provided with a cavity 133, inside which a polyurethane fine foamed material 51 having the initial hardness of "Asker C 30–85" and the apparent specific gravity of 0.30–0.70 is filled. The polyurethane fine foamed material 51 is in contact with a diaphragm F, which is then led to a passage 135 via a passage hole 137. When an operator moves a lever 139, water W will be discharged out of a spout 130B.

Figure 5:
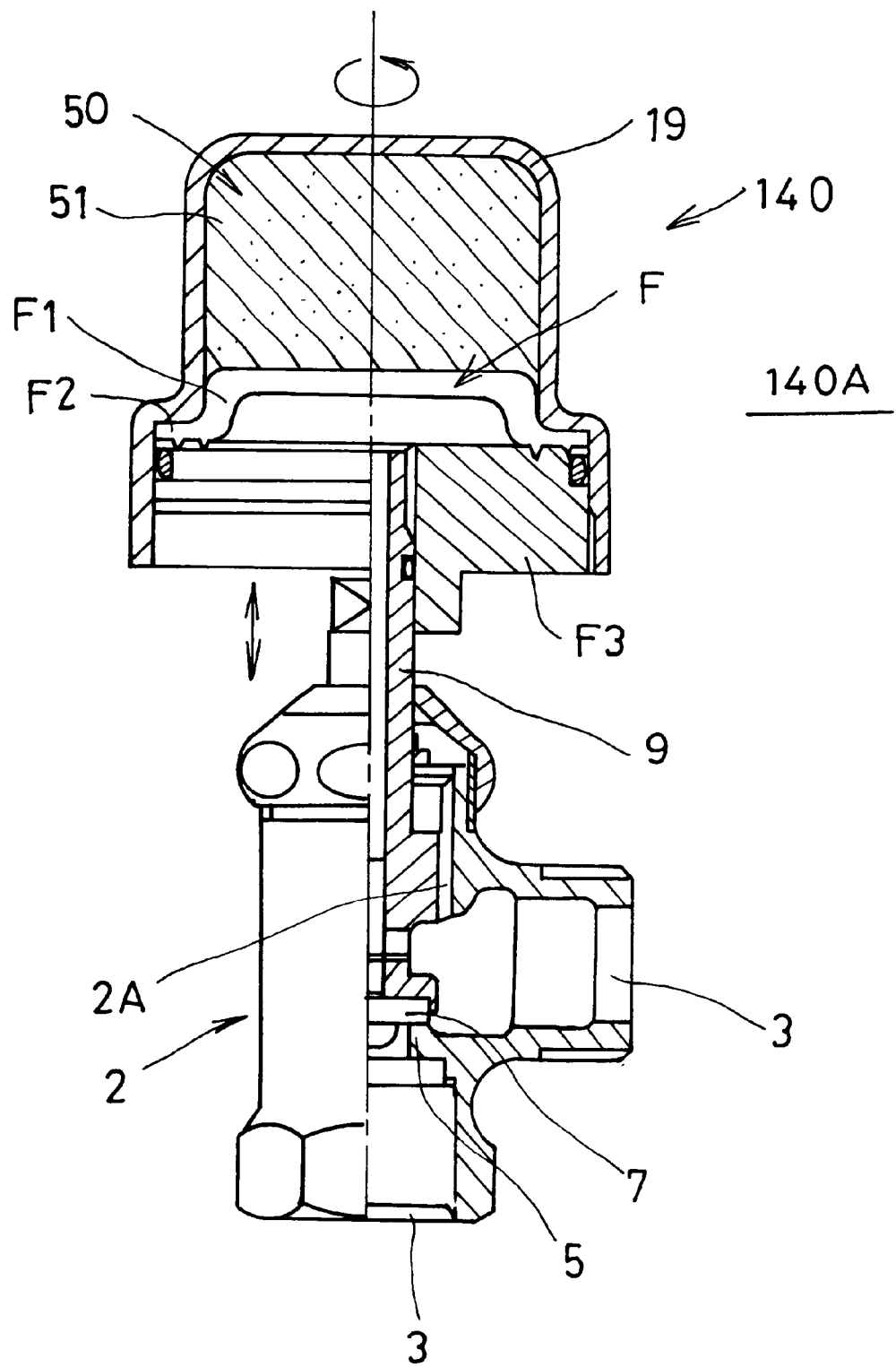
FIG. 5 is a sectional view of a liquid hammer prevention device according to a fifth embodiment of the present invention.

Now a fifth embodiment of the present invention will be described with reference to FIG. 5, showing a liquid hammer prevention device 140 incorporated in a spindle type of faucet 140A. The faucet 140A is a liquid hammer prevention device built-in type, having a handle 19 in which the liquid hammer prevention device 140 substantially the same as the liquid hammer prevention device 100 of the first embodiment as above discussed is incorporated. Thus the handle 19 incorporates a polyurethane fine foamed material 51 having the initial hardness of "Asker C 30–85" and the apparent specific gravity of 0.30–0.70. The liquid hammer prevention device built-in type of faucet 140A has a valve element 2, comprising a connector portion 3 connecting to a fluid channel, a valve seat 5 provided inside the connector portion 3, a spindle 9 engaged with a helicoid thread 2A of the valve main body 2, and a valve element 7 provided at the bottom of the spindle 9. When an operator opens or closes the handle 19, the spindle 9 moves in the direction of opening or closing of the fluid channel, so that the opening or closing between the valve element 7 and the valve seat 5 may be done. In the present embodiment, a hole penetrating through the spindle 9 from the connector portion 3 to a diaphragm F serves as a passage hole (orifice).

Figure 6:
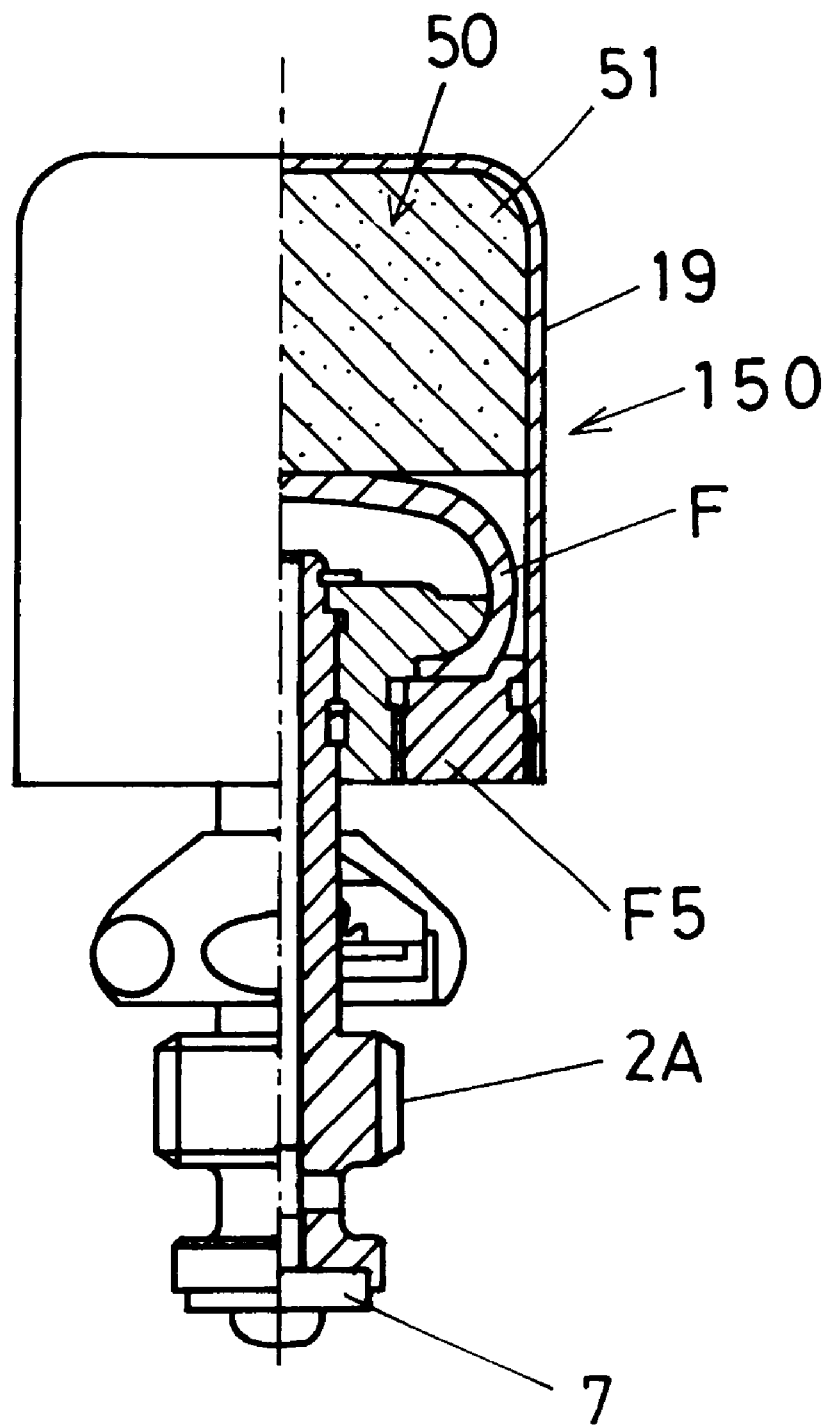
FIG. 6 is a sectional view of a liquid hammer prevention device according to a sixth embodiment of the present invention.

A sixth embodiment of the present invention will be described with reference to FIG. 6, also showing a spindle type of liquid hammer prevention device 150. The liquid hammer prevention device 150 is a modification of the liquid hammer prevention device 140 of the fifth embodiment, and is also incorporated in the handle 19 of the liquid hammer prevention device built-in type of faucet 140A. This polyurethane fine foamed material 51 incorporated in the handle 19 is also in the state that the initial hardness is "Asker C 30–85" and the apparent specific gravity is 0.30–0.70. As illustrated in the sectional view of FIG. 6, a diaphragm F is taller than that of liquid hammer prevention device 140 of the fifth embodiment, just like the shape of trap for catching octopus. Further, since a flange F5 supporting a diaphragm F comprises two pieces of structural member, the higher water sealing performance can be accomplished, and the shape of handle 19 becomes slimmer. The other structure is substantially the same as that of the liquid hammer prevention device 140 of the fifth embodiment as above discussed, thus the detailed explanation will not be done here.

The liquid hammer prevention devices 100, 110, 120, 130, 140 and 150 according to the first through fifth embodiments of the present invention have the structures as above discussed. Among these devices, there was made several experiments as to the liquid hammer prevention performance, with regard to the liquid hammer prevention device 140 adopting the polyurethane fine foamed material 51 as the elastic cushion 50, of which initial hardness is "Asker C 30–85" and apparent specific gravity is 0.30–0.70.

Figure 8:
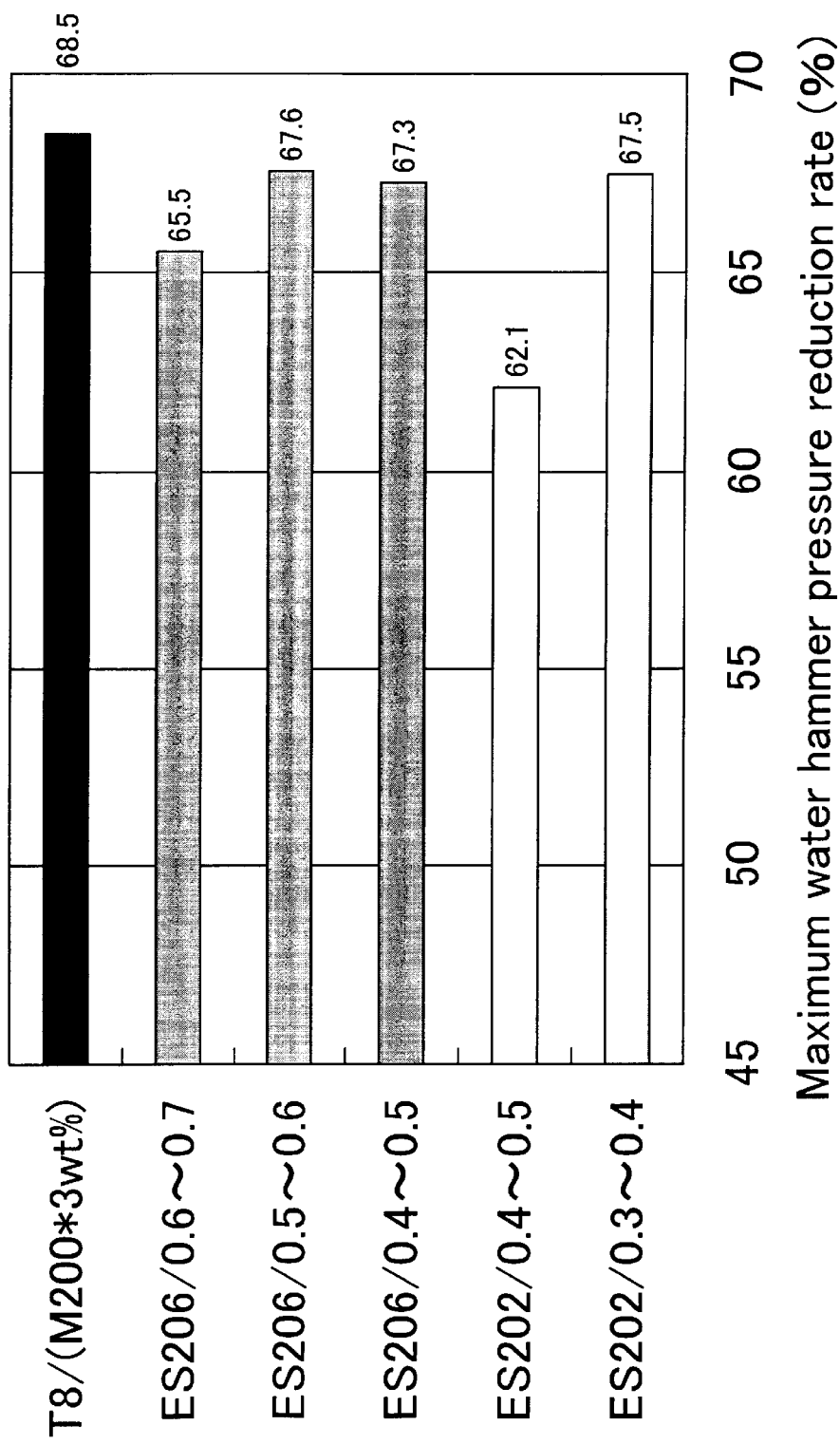
FIG. 8 is a graph showing characteristics of the liquid hammer prevention devices according to the first through sixth embodiments of the present invention.

FIG. 8 shows the comparative data of initial performance (maximum liquid hammer pressure reduction rate (%); attached to a spindle-type faucet; continuous water hammer application for 100 times) of the elastic cushions between an elastic hollow spheres added type of silicone gel K the polyurethane fine foamed material 51. The both elastic cushions are in the tall shape, just like that used for the water hammer arrestor "MW2" as above discussed, manufactured by the applicant. According to the graph of FIG. 8, the polyurethane fine foamed material 51 showed the good prevention performance close to that of the elastic hollow spheres added type of silicone gel K (68.5%) when the specific gravity was "0.6–0.7 (ES 206 of "Dumplon" manufactured by Nisshinbo Industries, Inc., hereinafter simply referred to as "ES" series)," "0.5–0.6 (ES 206)," "0.4–0.5 (ES 206)," "0.4–0.5 (ES 202)" or "0.3–0.4 (ES 206). "These data would show that the polyurethane fine foamed material 51 under these specifications may be acknowledged as the acceptable range to be applied to the practical liquid hammer prevention device.

Figure 7:
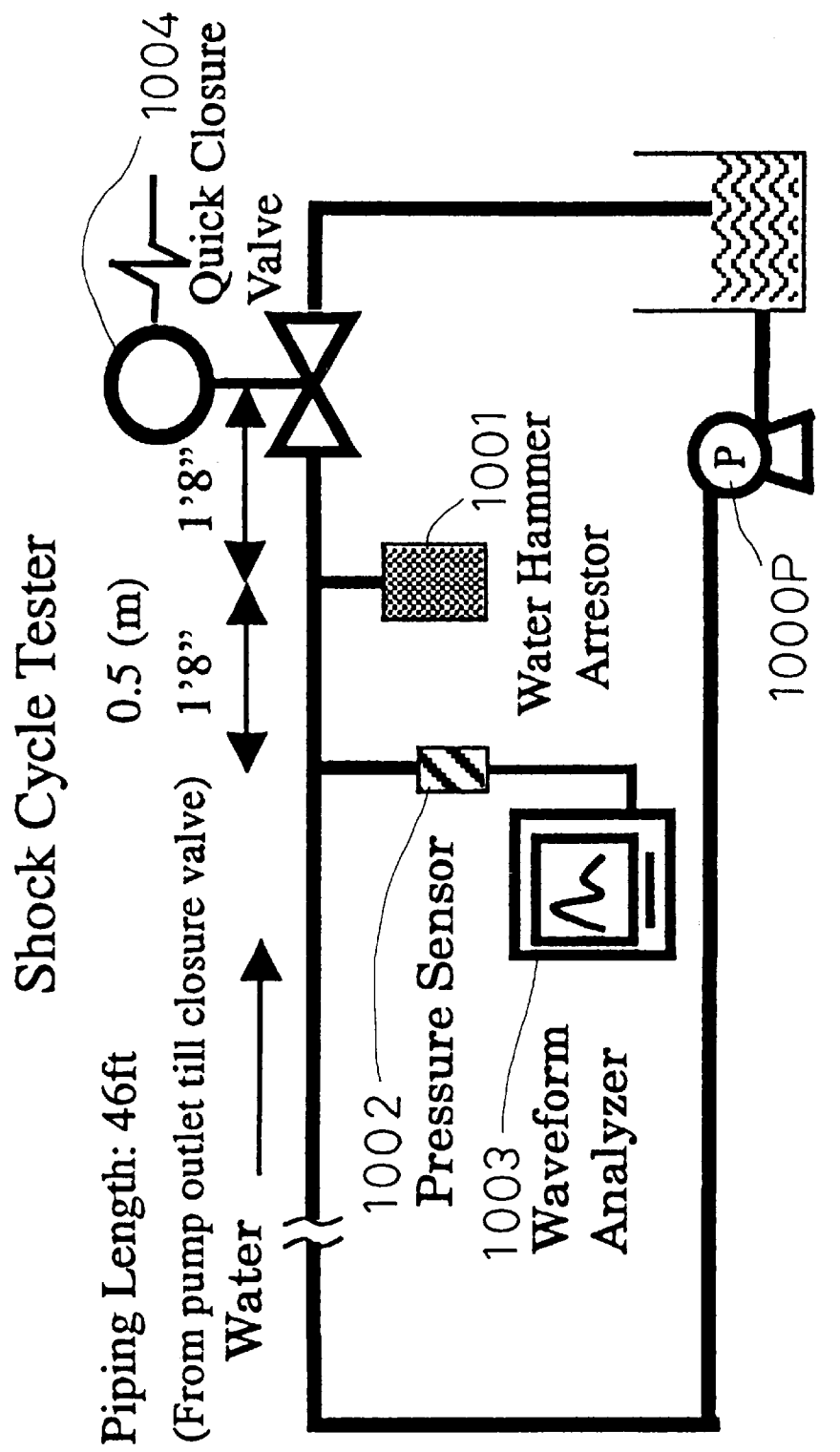
FIG. 7 is a block diagram showing the measuring method of maximum liquid hammer pressure reduction rate.

The measuring method of maximum liquid hammer pressure reduction rate will now be described with reference to FIG. 7. The maximum liquid hammer pressure reduction rate was measured by a shock cycle tester comprising a detachable water hammer arrestor 1001, a pressure sensor 1002, a waveform analyzer 1003, a quick closure valve 1004 and a pump 1000P. There is a piping having 14 m of the length and 12.7 mm of the inner diameter, running around this tester, inside which water has been filled. The pump 1000P circulates water inside this piping, under the line pressure at 0.2 MPa, flow rate at 20 liter/min, flow speed at 2.63 m/s, valve closing speed at 0.15–0.20 sec. The quick closure valve closes every 3.6 seconds. In these conditions, the pressure sensor 1002 receives the liquid hammer and the waveform analyzer 1003 displays the waveform of the liquid hammer. The test was continuously done for 21 days comparatively with or without the water hammer arrestor. The value obtained by deducting the maximum liquid hammer pressure received with the water hammer arrestor from the maximum liquid hammer pressure received without the water hammer arrestor, was divided by the maximum liquid hammer pressure received without the water hammer arrestor, and the obtained numeral was multiplied by 100. Thus, the obtained numeral showed the percentage of maximum liquid hammer pressure reduction rate.

Figure 9:
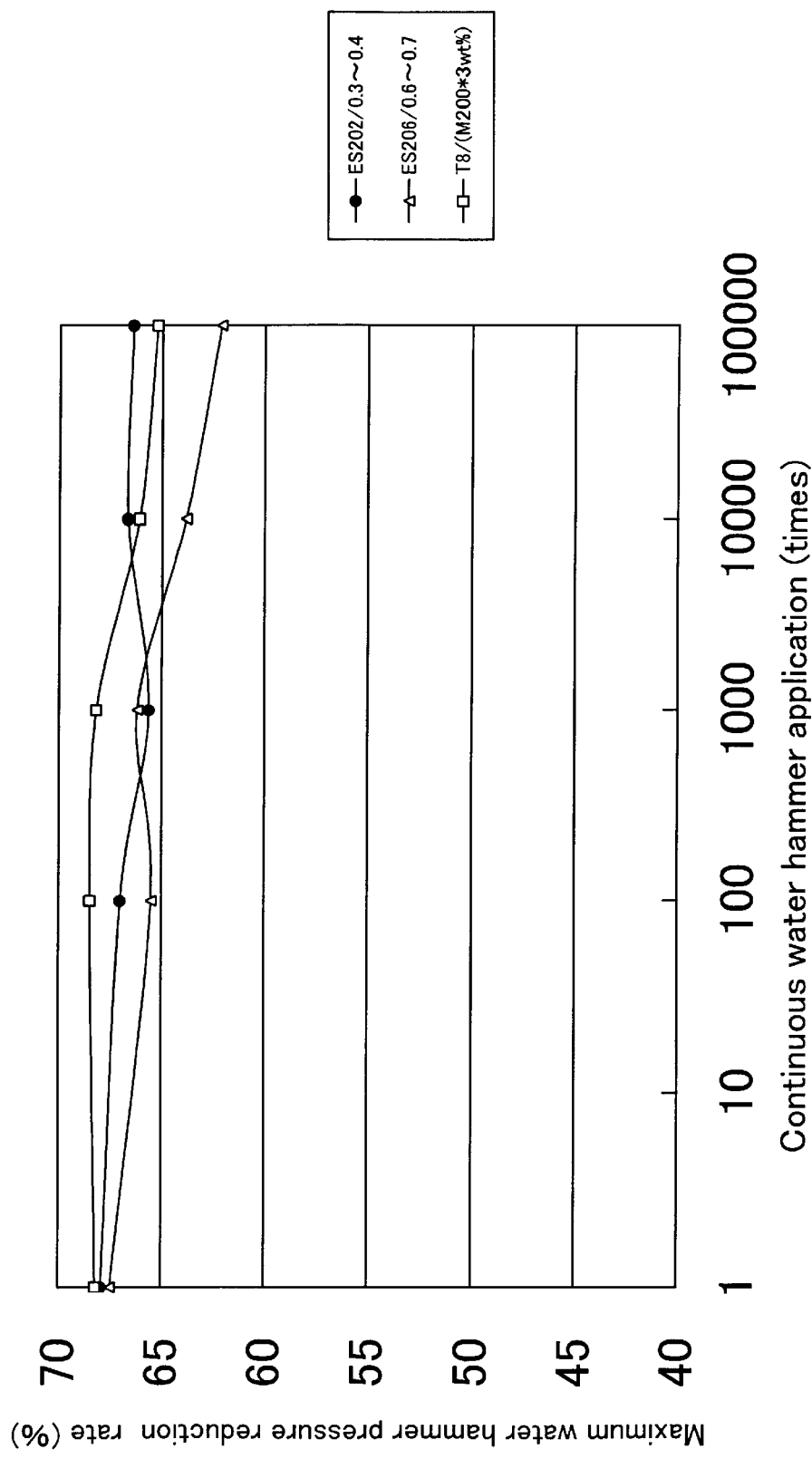
FIG. 9 is a graph showing characteristics of the liquid hammer prevention devices according to the first through sixth embodiments of the present invention.
Figure 10:
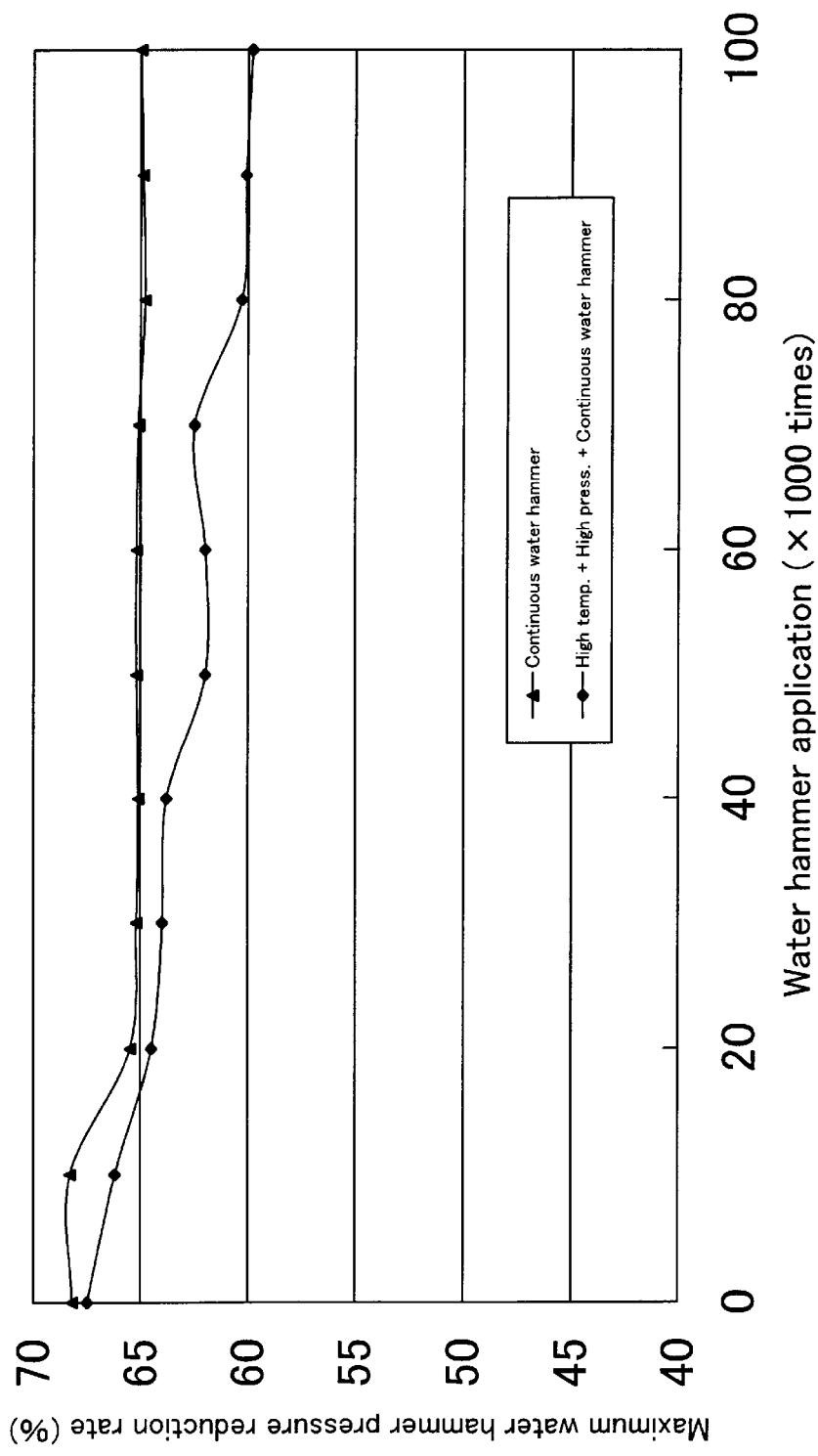
FIG. 10 is a graph showing characteristics of the liquid hammer prevention devices according to the first through sixth embodiments of the present invention.
Figure 11:
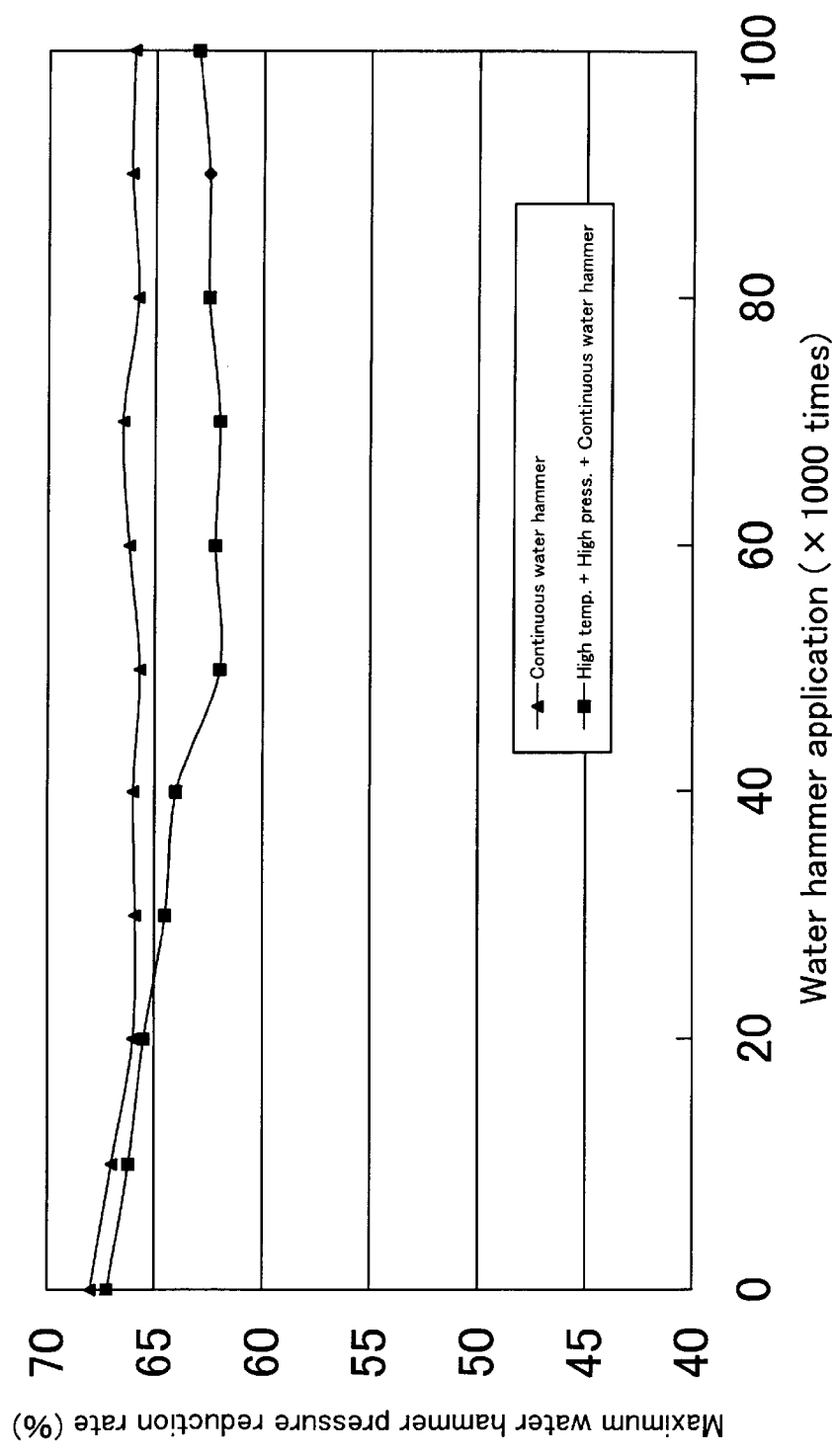
FIG. 11 is a graph showing characteristics of the liquid hammer prevention devices according to the first through sixth embodiments of the present invention.
Figure 12:
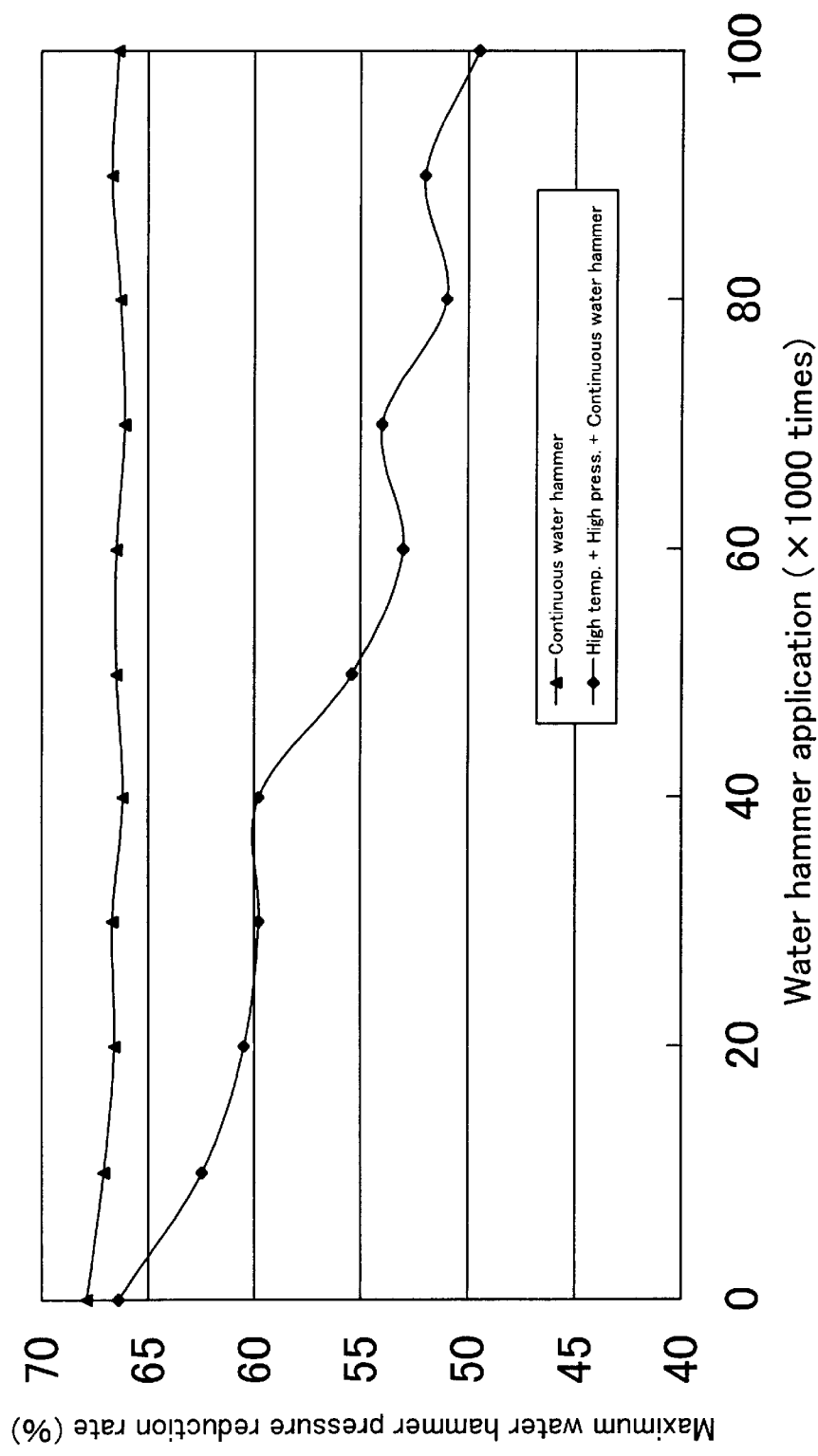
FIG. 12 is a graph showing characteristics of the liquid hammer prevention devices according to the first through sixth embodiments of the present invention.

FIG. 9 shows the comparative result of durability test of elastic cushions (maximum liquid hammer pressure reduction rate (%); attached to a spindle-type faucet; continuous water hammer application for 100,000 times (substantially equal to the actual number of water hammer occurrences in a house plumbing system for three years)) between the elastic hollow spheres added type of silicone gel K and the polyurethane fine foamed material 51, both in the tall shape used for the water hammer arrestor MW2 as above discussed. According to the graph of FIG. 9, it was confirmed that, until reaching 100,000 times of continuous water hammer application, the polyurethane fine foamed material 51 showed the best performance closest to the data of elastic hollow spheres added type of silicone gel K when using "ES 202" of which specified gravity was 0.3–0.4. The graph of FIG. 9 also shows that this kind of polyurethane fine foamed material 51 maintained the good performance until reaching 100,000 times of continuos water hammer application. Further, although "ES 206" of which specific gravity was 0.6–0.7 showed the poor performance than that of "ES 202" of which specific gravity was 0.3–0.4, "ES 206" maintained the pressure reduction rate exceeding 60% nevertheless, so it was proved that "ES 206" can still be applied to the practical use exceeding 100,000 times of continuous water hammers. FIGS. 10 through 12 show the comparative water hammer prevention characteristics between the elastic hollow spheres added type of silicone gel K and the polyurethane fine foamed material 51 under the normal condition and the bad condition (high temperature and high pressure). In these graphs, the data under normal condition are illustrated simply as "continuous water hammer," and the data under bad condition are illustrated as "high temperature+ high pressure+continuous water hammer." The temperature was set to 85° C. as high temperature, and the pressure was set to 0.65 MPa as high pressure (the maximum values that can be supposed in the ordinary house plumbing system). The graph of FIG. 10 shows the water hammer prevention performance of, and the application condition to the silicone gel cushion K in the shape of "MW2" water hammer arrestor. Until reaching 100,000 times of water hammer, the silicone gel cushion K showed the stable value of maximum water hammer pressure reduction performance rate (70–65%) under the normal condition. On the other hand, the maximum water hammer prevention rate under the bad condition became worse (60%), so it may be understood that the maximum water hammer prevention rate at 60% is the lower limit of acceptable water hammer prevention performance (i.e. mostly possible to arrest water hammer noise at above this level).

The graph of FIG. 11 shows the water hammer prevention performance of, and the application condition to the polyurethane fine foamed material "ES 202" of which specific gravity was 0.3–0.4. Until reaching 100,000 times of water hammer, this polyurethane fine foamed material showed the stable value of maximum water hammer pressure reduction rate (70–65%) under the normal condition. Further, this polyurethane fine foamed material still maintained good maximum water hammer pressure reduction rate (67–63%) under the bad condition. Consequently, it may be understood that "ES 202" of which specific gravity was 0.3–0.4 could maintain the same or even better maximum water hammer prevention performance for a long time as compared with the silicone gel cushion K.

The graph of FIG. 12 shows the water hammer prevention performance of, and the application condition to the polyurethane fine foamed material "ES 206" of which specific gravity was 0.6–0.7. Until reaching 100,000 times of water hammer, this polyurethane fine foamed material showed the stable value of maximum water hammer pressure reduction rate (70–65%) under the normal condition. However, the maximum water hammer pressure reduction rate of this polyurethane fine foamed material became seriously worse (50%) under the bad condition. Therefore it may be said that, although "ES 206" of which specific gravity is 0.6–0.7 showed the poor water hammer prevention performance under the bad condition, this material may still be used without any problem under the normal condition, and may be acceptable as long as the purpose of use thereof is limited.

The polyurethane fine foamed material 51 "ES 202," of which specific gravity is 0.3–0.4, has the initial hardness of "Asker C 55–70." Similarly, the polyurethane fine foamed material 51 "ES 206," of which specific gravity is 0.6–0.7, has the initial hardness of "Asker C 30–70." According to the initial hardness of each type of the polyurethane fine foamed material 51 acceptable for practical use in regard to the other durability and maximum liquid hammer pressure reduction rate, the acceptable polyurethane fine foamed material 51 will have the initial hardness of "Asker C 30–85" and the apparent specific gravity of 0.30–0.70. The above test data were obtained according to the spindle type of faucet, since the spindle type of faucet has the most facile execution workability and the largest number of demands in the market. It may of course be said, however, that any type of faucet other than the spindle type can show substantially the same performance as that of the spindle type.

As above described, the liquid hammer prevention devices 100, 110, 120, 130, 140 and 150 according to the first through sixth embodiments of the present invention, have the following effects and merits. First, the polyurethane fine foamed material 51 of which initial hardness is "Asker C 30–85" and apparent specific gravity is 0.30–0.70 is used as the elastic cushion 50. According to the results of the comparison test with the silicone gel cushion K, it has been proven that this type of polyurethane fine foamed material 51 is rather the harder elastic foamed material, comprising isolated fine elastic cells of which foaming magnification being higher and the diameter of each cell being smaller, having the excellent durability because of good compression set and repeated compression characteristics, with relatively small temperature dependency characteristic. In particular, the best performance could be displayed when using "Dumplon ES 202" of which initial hardness was "Asker C 55–70" and apparent specific gravity was 0.30–0.40, since the excellent and stable durability could be shown in that state both under the normal and bad conditions. Further, even in the case of using the low-cost and mass-production type of polyurethane fine foamed material 51 of which initial hardness was "Asker C 50–85" and the apparent specific gravity was 0.30–0.40, the good data substantially the same as the above material were still obtained.

Each of the liquid hammer prevention devices 100, 110, 120, 130, 140 and 150 is provided with a casing led to the fluid channel via the passage hole. The casing basically has two areas inside thereof partitioned by the diaphragm, that is the area led to the fluid channel of water pipe, and the area in which the elastic cushion formed by the polyurethane fine foamed material is accommodated. Accordingly, the liquid hammer prevention function displaying the excellent energy absorption and damping performance against the liquid hammer may be maintained for a long time.

Figure 13:
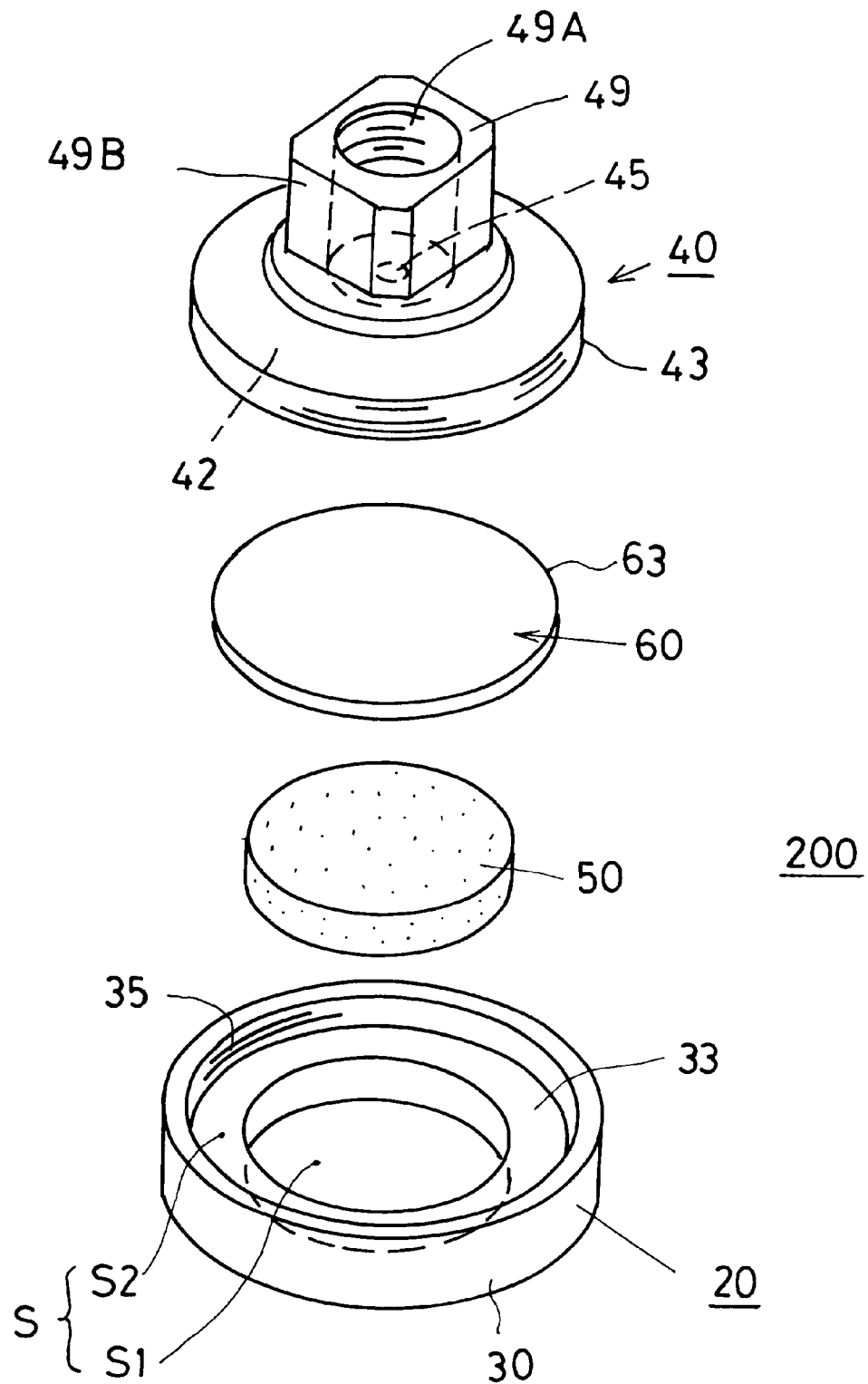
FIG. 13 is an exploded perspective view of a liquid hammer prevention device according to a seventh embodiment of the present invention.
Figure 14:
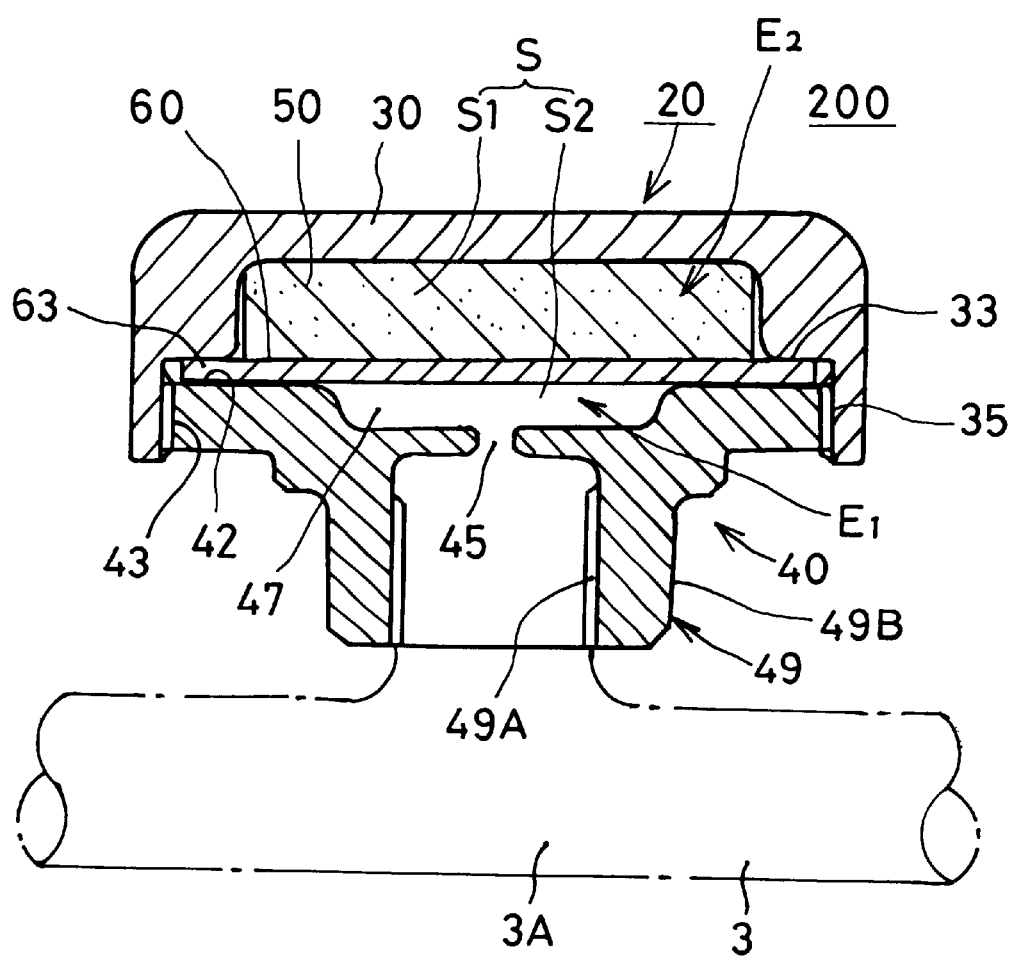
FIG. 14 is a sectional view of the liquid hammer prevention device according to the seventh embodiment of the present invention.
Figure 15:
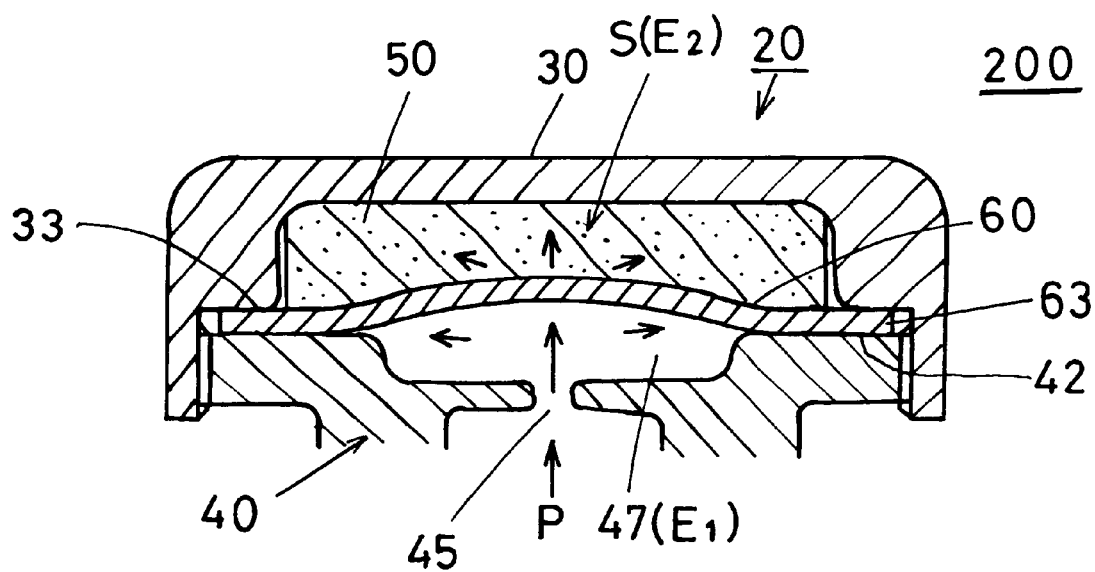
FIG. 15 is a partially sectional view of the liquid hammer prevention device showing the function thereof according to the seventh embodiment of the present invention.

Now other embodiments of the present invention, in which low-profile type of liquid hammer prevention devices are adopted, will be described with reference to FIGS. 13 through 18. First, a seventh embodiment of the present invention will be described with reference to FIGS. 13 through 15 illustrating a liquid hammer prevention device 200. There is a casing 20 comprising a hollow sectional shape of container 30 and a mounting element 40 engaged with the container 30. The container 30 is provided with a shallow dish-shape space S1, a larger diameter of peripheral rim stage 33 surrounding the outer periphery of the dish-shape space S1, and a female thread portion 35 on the opening inner wall above the peripheral rim stage 33. The disk shape of mounting element 40 is provided with a larger diameter of male thread portion 43 to be engaged with the female thread portion 35 of the container 30, a passage hole 45 penetrating the center of the mounting element 40 and leading to a space 47, and a connector portion 49 positioned on the other side of the passage hole 45 as seen from the space 47 and having a connector 49A on which a female thread is provided. The outer surface of the connector portion 49 is a square pillar shape, serving as an engagement portion 49B with a wrench.

When the casing 20 is assembled by engagement of the container 30 with the mounting element 40, a low-profile inner space S is formed inside the casing 20. The inner wall S comprises the dish-shape space S1 discussed above and another space S2. The positions in the space S2 are in the order of the space 47, the narrow passage hole 45 and the connector 49A so that the connector 49A may be placed on the water inlet side of the passage hole 45. The space S1 closely accommodates a low-profile elastic cushion 50 in the shape of low and large diameter cylinder. There is a thin plate shape of diaphragm 60 having a larger diameter than that of the elastic cushion 50, being in contact with and covering the exposed side (i.e. on the side facing the passage hole 45) of the elastic cushion 50. The diaphragm 60 is placed facing the passage hole 45 with having the space S2 therebetween, in the state of being caught in a gap between a press surface 42 of the mounting element 40 engaged with the container 30 and the peripheral rim stage 33 of the container 30. An outer rim 63 of the diaphragm 60 is supported by an inner wall of the casing 20.

As illustrated in FIG. 15, the liquid hammer protection device 200 is provided with the casing 20 led to a fluid channel 3A of a pipe 3 via the passage hole 45, and inside of the casing 20 is partitioned by the diaphragm 60 into two areas, i.e. an area E1 led to the fluid channel 3A, and an area E2 incorporating the low-profile elastic cushion 50. The diaphragm 60 is in the thin and flat plate shape.

The elastic cushion 50 is made of a polyurethane fine foamed material 51, of which initial hardness is "Asker C 30–85" and apparent specific gravity is 0.30–0.70, just like the cases of the first through sixth embodiments. Further, the diaphragm 60 is made of high-strength millable (heat vulcanizing) silicone rubber.

The manufacturing method of the elastic cushion 50 as well as that of the diaphragm 60 will now be described. For manufacturing the elastic cushion 50, the flat sheet material of which thickness is about 10 mm, for example, has been formed. Then the elastic cushions 50 in a predetermined cylindrical shape are punched out of the sheet material. The manufacturing of the diaphragm 60 is substantially the same as that of the elastic cushion 50. The flat sheet material of which thickness is about 1.5–5 mm (preferably 2 mm) has been formed, then the diaphragms 60 in a predetermined disk shape are punched out of the sheet material. When the elastic cushion 50 and the diaphragm 60 are manufactured by the above method, since the total thickness is about 12 mm, the cut surfaces will be smooth, and the facile and low-cost manufacturing can be accomplished.

Figure 16:
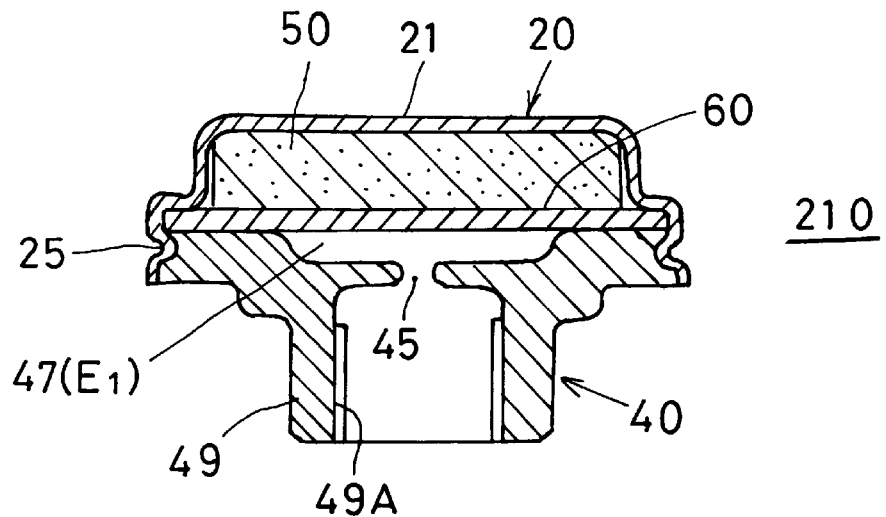
FIG. 16 is a sectional view of a liquid hammer prevention device according to an eighth embodiment of the present invention.

An eighth embodiment of the present invention will be described with reference to FIG. 16 illustrating another type of low-profile liquid hammer prevention device 210. According to the liquid hammer prevention device 210, a container 21 made of metal serves as the casing 20, which is secured by a caulking means 25 to a mounting element 40 having a connector 49A and a passage hole 45. The securing by the caulking means 25 has been discussed as the prior art with reference to FIG. 1. The other structure of this liquid hammer prevention device 210 is substantially the same as that of the liquid hammer prevention device 200 of the seventh embodiment as above discussed, so the same reference numerals will be allotted thereto and the detailed explanation will not be made here.

Figure 17:
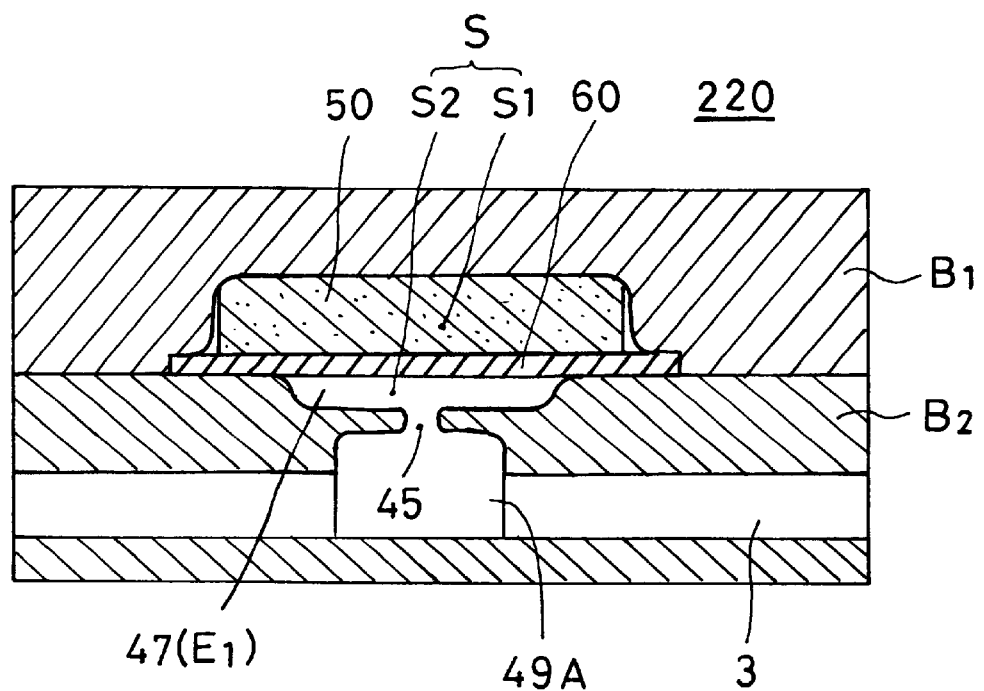
FIG. 17 is a sectional view of a liquid hammer prevention device according to a ninth embodiment of the present invention.

A ninth embodiment of the present invention will be described with reference to FIG. 17 illustrating a liquid hammer prevention device 220. The liquid hammer prevention device 220 comprises blocks BI and B2, each of which is relatively larger than an inner space S formed at the connecting portion thereof. There is a narrow passage hole 45 and a connector 49A on one side of the inner space S. The inner space S incorporates a low-profile and large diameter of elastic cushion 50, and a flat shape of diaphragm 60 having larger diameter than that of the elastic cushion 50, so that the elastic cushion 50 may be in contact with and placed on the diaphragm 60. Another surface of the diaphragm 60 not being in contact with the elastic cushion 50 is facing the passage hole 45 with having a space 47 therebetween. The liquid hammer prevention device 220 according to the ninth embodiment has no protrusive portion due to the structure of this liquid hammer prevention device, thus much downsizing thereof may be accomplished. The other structure of this liquid hammer prevention device 220 is substantially the same as that of the liquid hammer prevention device 200 of the seventh embodiment as above discussed, so the same reference numerals will be allotted thereto and the detailed explanation will not be made here.

The function of the liquid hammer prevention devices 200, 210 and 220 according to the seventh through ninth embodiments will now be described. As discussed above, each of the liquid hammer prevention devices 200, 210 and 220 comprises the elastic cushion 50 in the low-profile and large-diameter shape, and the thin and flat plate shape of diaphragm 60 having larger diameter than that of the elastic cushion 50. The outer rim 63 of the diaphragm 60 is supported by the inner wall 23 of the casing 20.

With this structure, both the elastic cushion 50 and the diaphragm 60 have the wide areas for receiving pressure due to their low-profile and large-diameter shape. Consequently, when a liquid hammer P applies the pressure to the elastic cushion 50 via the passage hole 45, since the displacement in the horizontal direction toward the outer periphery is added thereto, the displacement amount in the horizontal direction increases, thus the displacement amount in the perpendicular direction relatively decreases. Therefore, although the "clearance in the perpendicular direction" in the direction of liquid hammer application has been required for the diaphragm in the prior art in order to secure the sufficient expansion space of the diaphragm, according to the present embodiments, the substantially same performance as the diaphragm of the prior art can be obtained the thin and flat plate shape of diaphragm. Further, when using the elastic cushion 50 and the diaphragm 60, the mechanical durability and liquid sealing function may be maintained for a long time.

Figure 18:
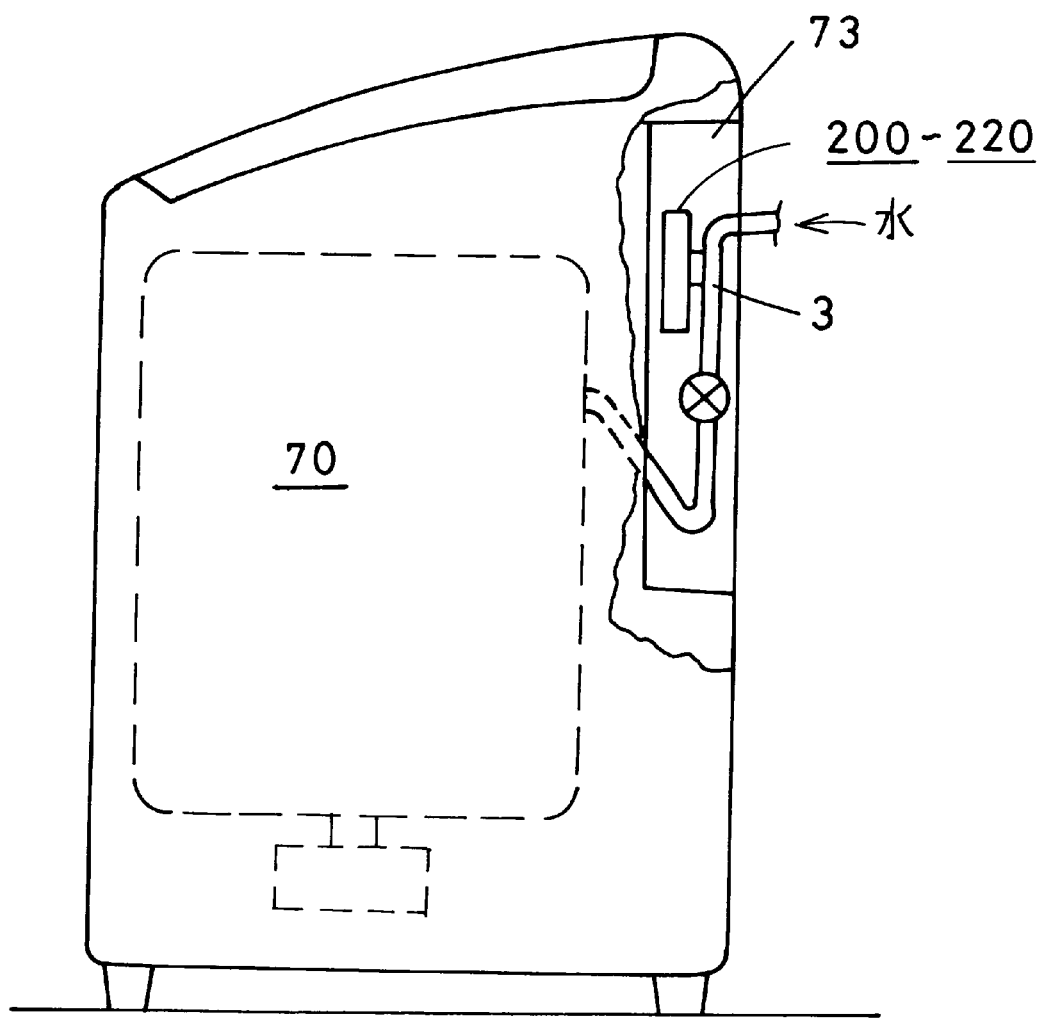
FIG. 18 is a view showing a mounting state of the liquid hammer prevention device according to the seventh through ninth embodiments of the present invention.

Since the polyurethane fine foamed material 51 is in low-profile and the diaphragm 60 is in the flat plate shape, the overall height of the elastic cushion 50 and the diaphragm 60 may be lowered. Thus the height of the liquid hammer prevention device 200, 210 and 220 may lowered, which may contribute to the downsizing thereof. Consequently, as illustrated in FIG. 18 for example, the liquid hammer prevention device 200, 210 or 220 may be attached to a pipe 3 running inside a narrow mounting space 73 of a washer 70.

Further, since the elastic cushion 50 is in low-profile and the diaphragm is in the flat plate shape, they may be manufactured by being punched out of the predetermined thickness of sheet materials. Thus the elastic cushion and the diaphragm may be manufactured at the lower cost, thereby the liquid hammer protection device may also be provided at the lower cost, so the liquid hammer prevention device may be easily installed in laundry or dish washer for housekeeping. The manufacturing method of elastic cushion and diaphragm is of course not limited to that of seventh through ninth embodiments discussed above, that is, the punching thereof out of the predetermined thickness of sheet materials.

As above described, the liquid hammer prevention devices 200, 210 and 220 according to the seventh through ninth embodiments of the present invention, have the following merits.

First, the polyurethane fine foamed material 51 of which initial hardness is "Asker C 30–85" and apparent specific gravity is 0.30–0.70 has the excellent energy absorption and damping performance against the liquid hammer, and the liquid hammer prevention function may be maintained for a long time, and the required volume may be obtained by also using an arbitrary shape such as low-profile. Further, even when the volume is reduced to a predetermined amount, the energy absorption and damping characteristic may be still maintained, thereby the downsizing of the liquid hammer prevention device may be accomplished.

Second, according to the liquid hammer prevention devices 200, 210 and 220, the polyurethane fine foamed material is adopted as the elastic cushion so that the excellent liquid hammer prevention function as to the energy absorption and damping against the liquid hammer may be maintained even when the height of the elastic cushion is lowered. Since the polyurethane fine foamed material is in low-profile and large-diameter, and the diaphragm is in the thin and flat plate shape of which diameter is larger than that of the elastic cushion, the overall height of the elastic cushion and the diaphragm may be lowered. Consequently, the liquid hammer prevention device having low-profile and downsized structure may be accomplished. Thus the liquid hammer prevention device may be easily installed inside the wall or any other narrow space of water or liquid related instruments.

Third, the elastic cushion and the diaphragm may be manufactured by being punched out of the predetermined thickness of sheet material, thus the elastic cushion and the diaphragm may be manufactured at the lower cost, and liquid hammer prevention device may be provided at the lower cost. Therefore, the liquid hammer prevention device may be installed at the lower cost in various water or liquid related instruments such as the washer for housekeeping.

The liquid hammer prevention device according to the present invention is of course not limited to the above discussed embodiments, and any modification and variation is possible without departing from the spirit and the scope of the present invention. For example, the liquid hammer prevention device is not limited to that attached to the faucet of house, and may also be attached to the place under the sink, or directly to the main pipe of water supply. The liquid hammer prevention device is not limited to those applied to the water related instruments, and may also be applied to other instruments relating to other liquid such as oil. The shape of the liquid hammer prevention device is not limited to that independently used as the liquid hammer prevention device itself, but to that serving as one of the assembly parts installed in the household appliances. The casing 20 may be made of any type of reinforced plastic or stainless steel or other material. Further, the material of the diaphragm 60 may also be changed.

Figure 19:
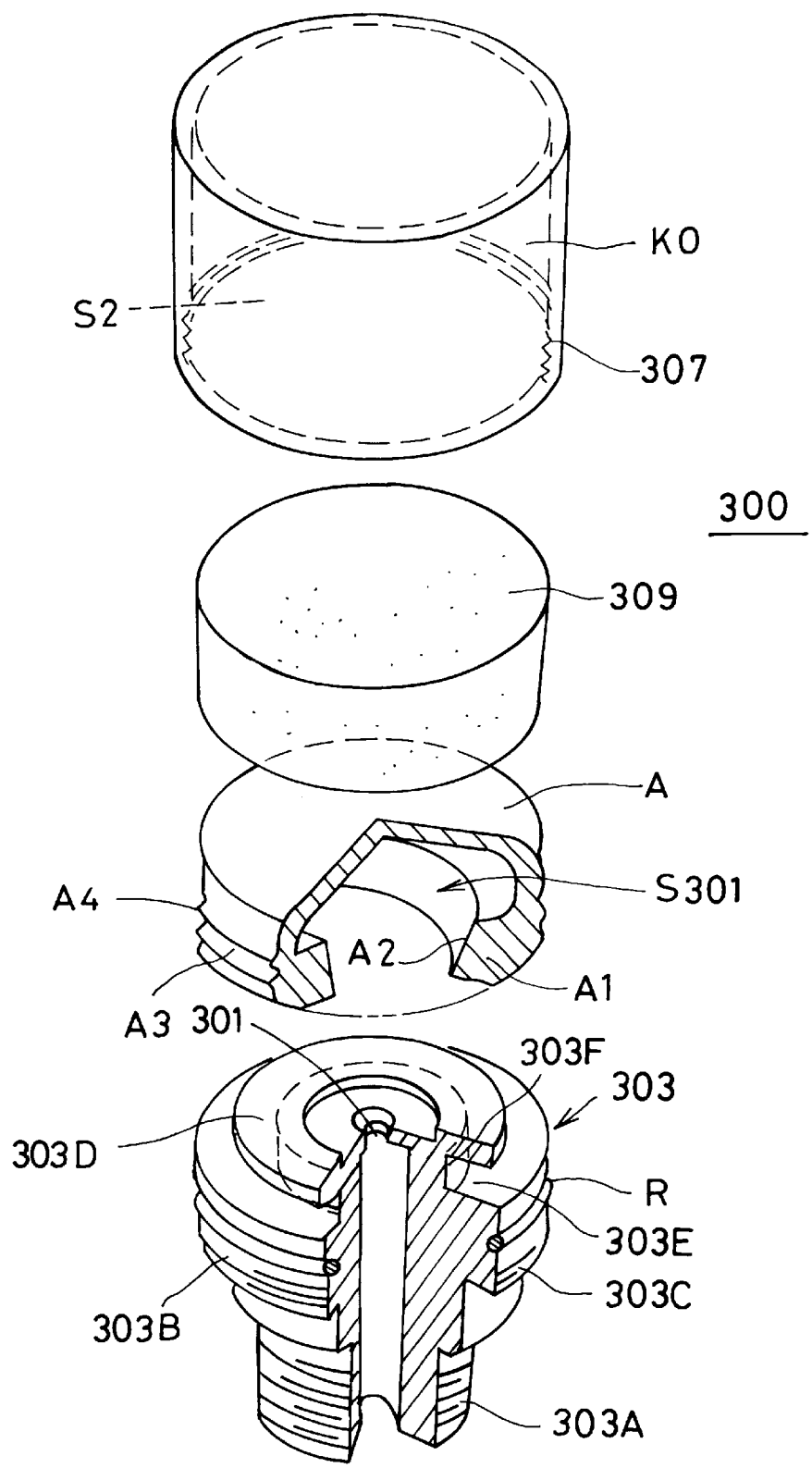
FIG. 19 is an exploded perspective view of a liquid hammer prevention device according to a tenth embodiment of the present invention.
Figure 20:
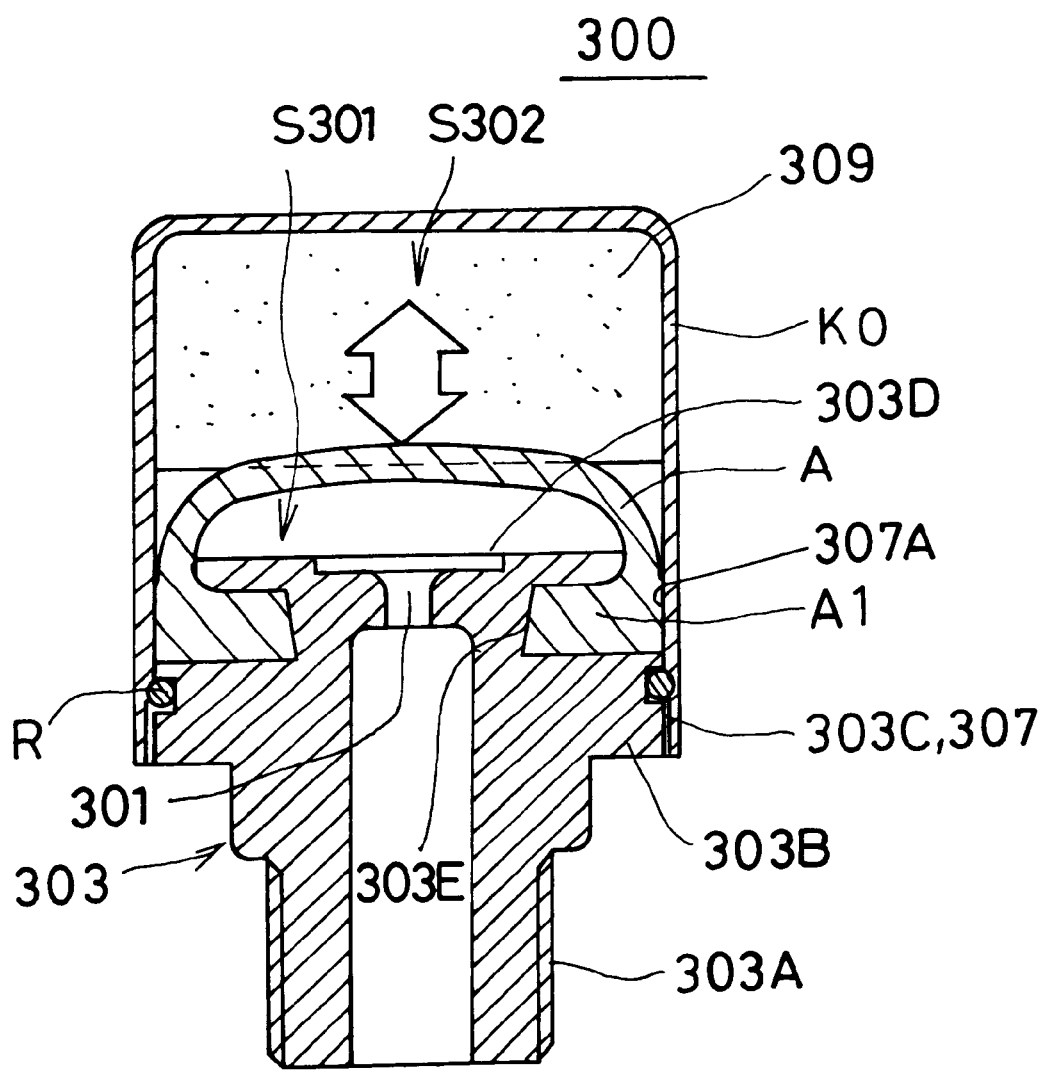
FIG. 20 is a sectional view of the external attachment type of liquid hammer prevention device according to the tenth embodiment of the present invention.

Now a tenth embodiment of the present invention will be discussed with reference to FIGS. 19, 20 and 22. There is a liquid hammer prevention device 300 as illustrated in FIG. 19, comprising a casing K0, an elastic cushion 309 incorporated in the casing K0, a main body 303 incorporated in the casing K0 and having a passage hole 301 led to a fluid channel, and a diaphragm A. The diaphragm A has an engagement protrusive portion A1 formed at an opening rim of the diaphragm A protruding in the inward radius direction ("D1" of FIG. 22) of the opening rim, and the engagement protrusive portion A1 is engaged with an engagement groove 303E formed at a head 303D of the main body 303 in the shape of groove. Further, there is an inner wall 307A provided on the inner periphery of the casing K0 serving to secure the diaphragm A, thus the diaphragm A is fixed on and secured to the main body 303.

The main body 303 is provided with a thread portion 303A serving to connect the main body 303 to the pipe of fluid channel. The main body 303 has the passage hole 301 led to the fluid channel. There is a mounting thread portion 303C provided on an outer periphery portion 303B of the main body 303, and when the casing K0 is put on the main body 303, a thread portion 307 provided inside the casing K0 becomes engaged with this thread portion 303C, thereby the inner space formed between the casing K0 and the main body 303 is sealed tightly. The outer periphery portion 303B of the main body 303 is also provided with a ring groove with which an O-ring R is engaged, so that the O-ring R may press the inner wall 307A of the casing K0 in order to maintain the tightness of liquid sealing. The structure of this O-ring engagement, however, will not always be necessary, since the tight engagement of the engagement protrusive portion A1 with the engagement groove 303E may maintain the sufficient liquid sealing performance.

The engagement groove 303E is integrally formed at the head 303D of the main body 303 inserted in and secured to the casing K0. The engagement groove 303E is engaged with the engagement protrusive portion A1, formed at the opening rim of the diaphragm A protruding in the inward radius direction D1 (see FIG. 22). The diaphragm A is fixed on and secured to the space between the casing K0 and the main body 303, by engagement of the engagement protrusive portion A1 with the engagement groove 303E of the main body 303 and with the inner wall 307A of the casing K0. Thus the diaphragm A partitions the space inside the casing K0 into two areas, that is, an area S301 led to the fluid channel via the passage hole 301, and an area S302 provided for an elastic cushion 309 incorporated in the casing K0.

Figure 22:
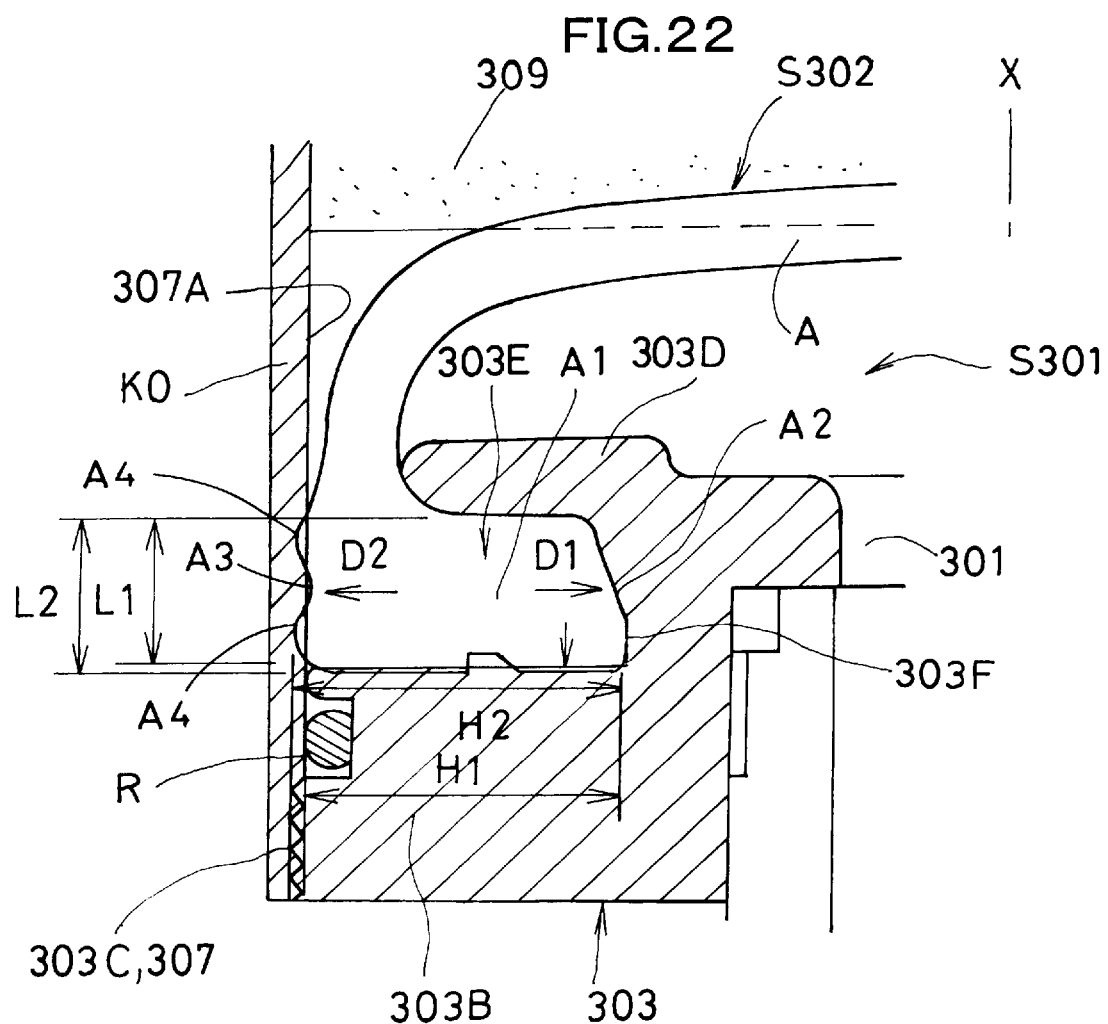
FIG. 22 is a sectional view showing the function of diaphragm according to the tenth and eleventh embodiments of the present invention.

As illustrated in FIG. 22, the engagement protrusive portion A1 of the diaphragm A has protrusive portions A4 comprising two protrusives outwardly protruding in the radius direction, provided on an outer peripheral surface A3. The width H2 of the engagement protrusive portion A1, that is the length in the radius direction between an inner peripheral surface A2 and the outer peripheral surface A3 of the engagement protrusive portion A, is not less than the width H1, that is the length in the radius direction between a side wall peripheral surface 303F of the engagement groove 303E and the inner wall 307A of the casing K0.

With the structure as above discussed, the engagement protrusive portion A1 of the diaphragm A is fixed on and secured to the main body 303 and the casing K0, by the engagement groove 303E of the main body 303 and by the inner wall 307A of the casing K0. Consequently, the outer peripheral surface A3 of the engagement protrusive portion A1 is pressed by the inner wall 307A of the casing K0, thereby the engagement protrusive portion A1 is deformed expanding both in the inward radius direction D1 and the outward radius direction D2. Further, both the top and the bottom of the engagement protrusive portion A1 are also deformed expanding in the axial direction X. Accordingly, the inner peripheral surface A2 of the engagement protrusive portion A1 is pressed by the side wall peripheral surface 303F of the engagement groove 303E.

The thickness L2 (the length in the axial direction X) of the engagement protrusive portion A1 of the diaphragm A is slightly (practically, about 0.1 mm) larger than the groove width L1 (the length in the axial direction X) of the engagement groove 303E. In the present embodiment, it may also be possible to set the thickness L2 and the groove width L1 to be the same size. According to this relation of size, the top and the bottom of the engagement protrusive portion A1 are respectively pressed by the upper end and the lower end of the engagement groove 303E.

The diaphragm A may be preferably made of high-strength millable (heat vulcanizing) silicone rubber having excellent abrasion resistance. The elastic cushion 309 may be preferably made of foamed material having the initial hardness of "Asker C 30–85" and the apparent specific gravity of 0.30–0.70. The details thereof are substantially the same as those discussed in the first through ninth embodiments.

Figure 21:
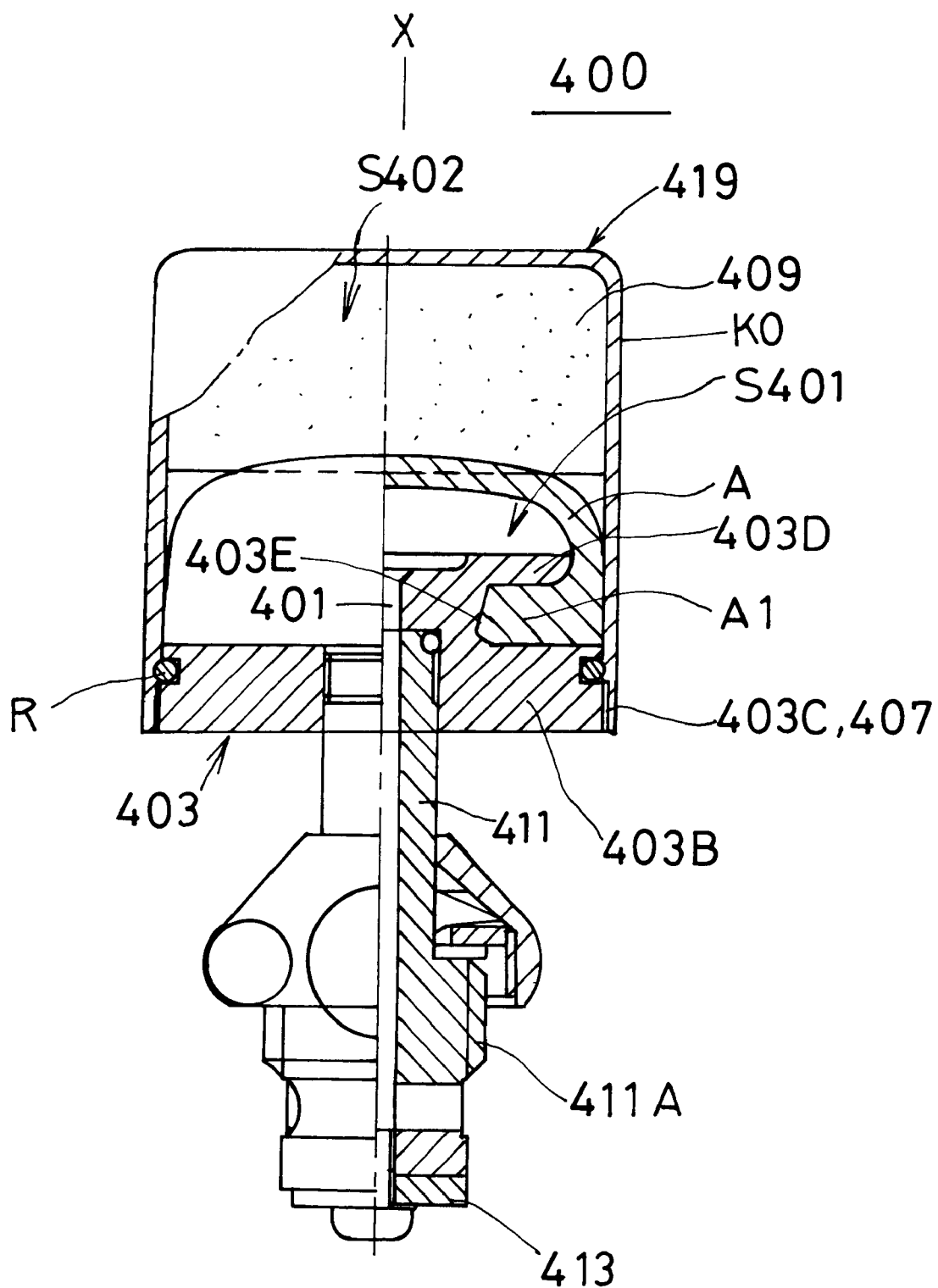
FIG. 21 is a sectional view of a faucet built-in type of liquid hammer prevention device according to an eleventh embodiment of the present invention.

Further, an eleventh embodiment of the present invention as illustrated by a liquid hammer prevention device 400 of FIG. 21 will be described. The liquid hammer prevention device 400 is incorporated in a handle 419 which opens and closes a spindle 411. The spindle 411 comprises a thread portion 411A engaged with a female thread portion of a valve main body (not shown) and a valve element 413 provided at the bottom of the spindle 411. There is a main body 403 engaged with the top of the spindle 411, and a passage hole 401 coaxially penetrates the center of the spindle 411 and the main body 403. The other structure is substantially the same as that of the liquid hammer prevention device 300 discussed above, so the detailed description thereof will not be done here.

Now the function of the liquid hammer prevention device 300 of the tenth embodiment and the liquid hammer prevention device 400 of the eleventh embodiment, having the structure as above discussed, will be described with reference to the liquid hammer prevention device 300 as the typical example. The engagement groove 303E provided at the head 303D of the main body 303 is engaged with the engagement protrusive portion A1, formed at the opening rim of the diaphragm A protruding in the inward radius direction D1. The diaphragm A is fixed on and secured to the space between the casing K0 and the main body 303, by engagement of the engagement protrusive portion A1 with the engagement groove 303E of the main body 303 and with the inner wall 307A of the casing K0. Thus the diaphragm A partitions the space inside the casing K0 into two areas, that is, the area S301 led to the fluid channel via the passage hole 301, and the area S302 provided for the elastic cushion 309 incorporated in the casing K0.

The engagement structure of the engagement protrusive portion A1 with the engagement groove 303E serves as the sealing means of the area S301 led to the fluid channel via the passage hole 301, and the sealing means of the area S302 provided inside the casing K0 in order to accommodate the elastic cushion 309 therein. The engagement protrusive portion A1 of the diaphragm A has protrusive portions A4 outwardly protruding in the radius direction, provided on an outer peripheral surface A3. The width H2 of the engagement protrusive portion A1, that is the length in the radius direction between the inner peripheral surface A2 and the outer peripheral surface A3 of the engagement protrusive portion A, is not less than the width H1, that is the length in the radius direction between the side wall peripheral surface 303F of the engagement groove 303E and the inner wall 307A of the casing K0. Consequently, the outer peripheral surface A3 of the engagement protrusive portion A1 is pressed by the inner wall 307A of the casing K0, thereby the engagement protrusive portion A1 is deformed expanding both in the inward radius direction D1 and the outward radius direction D2. Further, both the top and the bottom of the engagement protrusive portion A1 are also deformed expanding in the axial direction X. Accordingly, the inner peripheral surface A2 of the engagement protrusive portion A1 is pressed by the side wall peripheral surface 303F of the engagement groove 303E, thereby each of the areas S301 and S302 is tightly sealed.

The thickness L2 (the length in the axial direction X) of the engagement protrusive portion A1 of the diaphragm A is slightly (practically, about 0.1 mm) larger than the groove width L1 (the length in the axial direction X) of the engagement groove 303E. Thus the top and the bottom of the engagement protrusive portion A1 are respectively pressed by the upper end and the lower end of the engagement groove 303E, thereby the tight liquid sealing performance is also maintained.

As above discussed, the combination of engagement protrusive portion A1 with each inner surface of the engagement groove 303E serves to maintain the tight liquid sealing performance. Consequently, even when the fluid exists in the area S301 coming from the fluid channel through the passage hole 309, it is possible to prohibit the intrusion of that fluid into the space around the elastic cushion 309 incorporated in the area S309 of the casing K0. Accordingly, there is no possibility of intrusion of fluid, from the area led to the fluid channel via the passage hole, into the other area inside the casing in which the elastic cushion is incorporated, thus the floating of elastic cushion in the fluid will not occur, so the excellent performance serving as the liquid hammer prevention device can be maintained for a long time. According to the result of durability test, the liquid hammer prevention performance was maintained after 400,000 times of continuous water hammer application. Further, the test result also reported that there occurred no leakage of fluid out of the casing K0. The function discussed above is also applicable to the liquid hammer prevention device 400.

The liquid hammer prevention devices 300 and 400 according to the tenth and eleventh embodiments have the following function. First, the combination of engagement protrusive portion A1 of the diaphragm A with the engagement groove 303E of the main body 303 serves to maintain the tight liquid sealing performance. Consequently, there is no possibility of intrusion of fluid, from the area led to the fluid channel via the passage hole, into the other area inside the casing in which the elastic cushion is incorporated, thus the floating of elastic cushion in the fluid will not occur, so the excellent performance serving as the liquid hammer prevention device can be maintained for a long time.

Second, there is no possibility of leakage of fluid out of the casing, so the good condition of the device itself can be maintained. The engagement groove provided at the head of the main body is engaged with the engagement protrusive portion, formed at the opening rim of the diaphragm protruding in the inward radius direction. In addition, the diaphragm is fixed on and secured to the space between the casing and the main body, by engagement of the engagement protrusive portion with the engagement groove of the main body, and with the inner wall of the casing. Therefore, the liquid hammer prevention device according to the present invention requires less number of assembly parts as well as less number of assembly working steps. So the liquid hammer prevention device may be manufactured at the lower cost, maintaining the uniformity of product quality at the same time.

Figure 23:
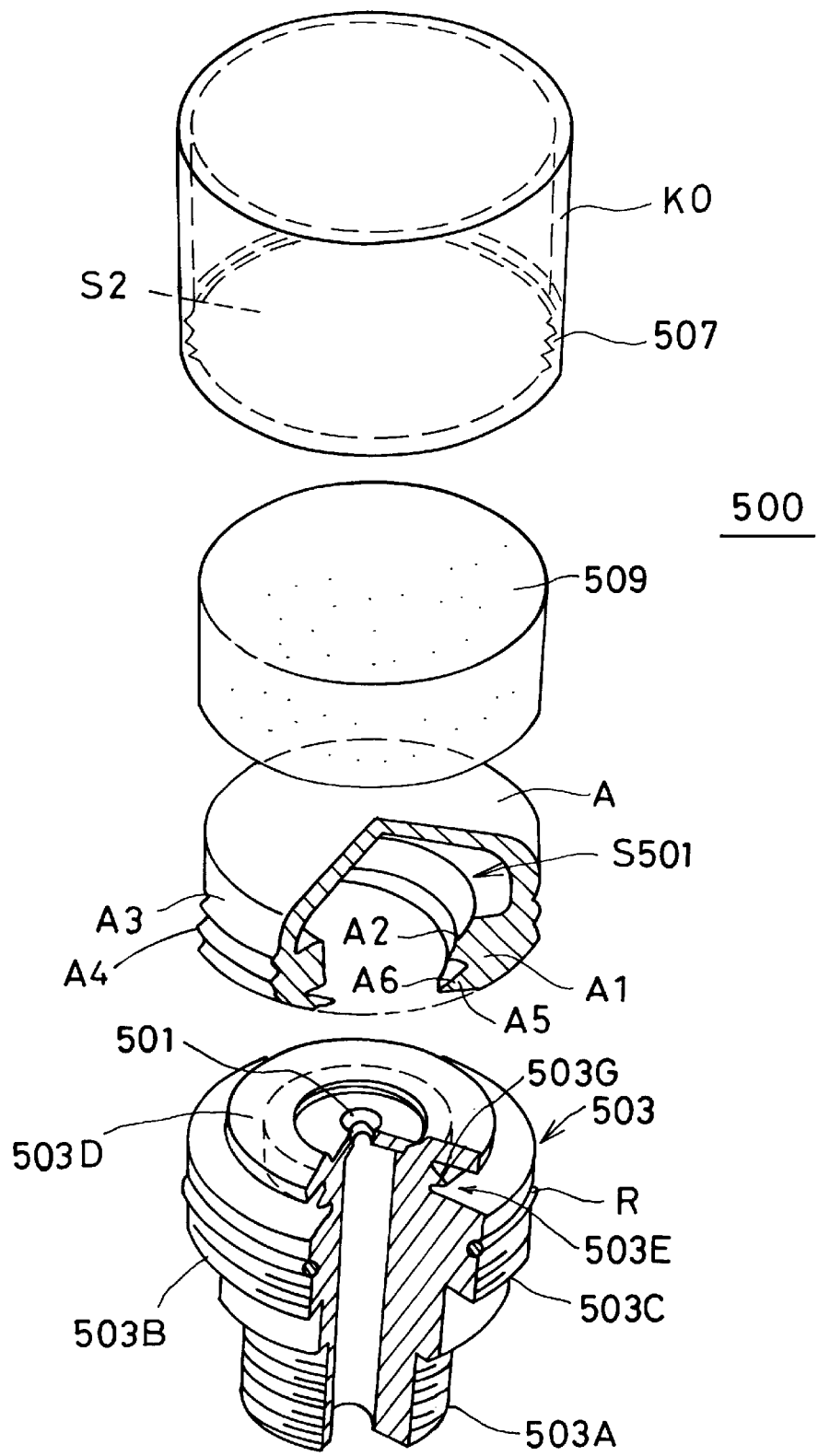
FIG. 23 is an exploded perspective view of a liquid hammer prevention device according to a twelfth embodiment of the present invention.

Now a twelfth embodiment of the present invention will be described with reference to a liquid hammer prevention device 500 of FIGS. 23 and 24. As illustrated in FIG. 23, the liquid hammer prevention device 500 comprises a casing K0, an elastic cushion 509 incorporated in the casing K0, a main body 503 incorporated in the casing K0 and having a passage hole 501 led to a fluid channel, and a diaphragm A. The diaphragm A has an engagement protrusive portion A1 formed at an opening rim of the diaphragm A protruding in the inward radius direction ("D1" of FIG. 24) of the opening rim, and the engagement protrusive portion A1 is engaged with an engagement groove 503E formed at a head 503D of the main body 503 in the shape of groove. Further, there is an inner wall 507A provided on the inner periphery of the casing K0 serving to secure the diaphragm A, thus the diaphragm A is fixed on and secured to the main body 503.

The main body 503 is provided with a thread portion 503A serving to connect the main body 503 to the pipe of fluid channel. The main body 503 has the passage hole 501 led to the fluid channel. There is a mounting thread portion 503C provided on an outer periphery portion 503B of the main body 503, and when the casing K0 is put on the main body 503, a thread portion 507 provided inside the casing K0 becomes engaged with this thread portion 503C, thereby the inner space formed between the casing K0 and the main body 503 is sealed tightly. The outer periphery portion 503B of the main body 503 is also provided with a ring groove with which an O-ring R is engaged, so that the O-ring R may press the inner wall 507A of the casing K0 in order to maintain the tightness of liquid sealing. The structure of this O-ring engagement, however, will not always be necessary, since the tight engagement of the engagement protrusive portion A1 with the engagement groove 503E may maintain the sufficient liquid sealing performance.

The engagement groove 503E is integrally formed at the head 503D of the main body 503 inserted in and secured to the casing K0. The engagement groove 503E is engaged with the engagement protrusive portion A1, formed at the opening rim of the diaphragm A protruding in the inward radius direction D1 as illustrated in FIG. 24. The diaphragm A is fixed on and secured to the space between the casing K0 and the main body 503, by engagement of the engagement protrusive portion A1 with the engagement groove 503E of the main body 503 and with the inner wall 507A of the casing K0. Thus the diaphragm A partitions the space inside the casing K0 into two areas, that is, an area S501 led to the fluid channel via the passage hole 501, and an area S502 provided for an elastic cushion 509 incorporated in the casing K0.

Figure 24:
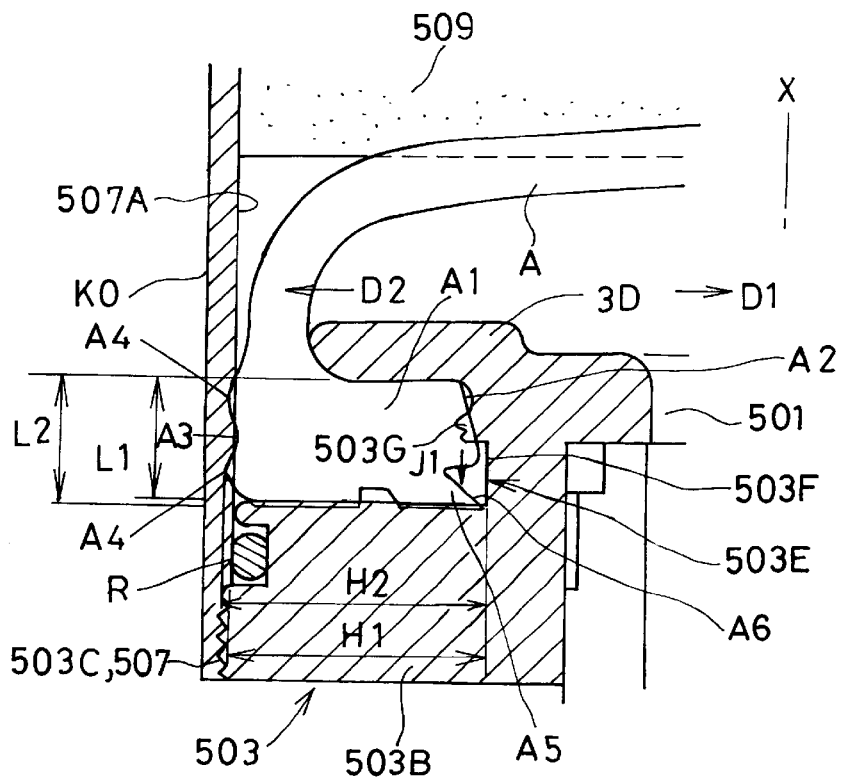
FIG. 24 is a sectional view showing the function of diaphragm according to the twelfth embodiment of the present invention.

As illustrated in FIG. 24, the engagement protrusive portion A1 of the diaphragm A has protrusive portions A4 comprising two protrusives outwardly protruding in the radius direction, provided on an outer peripheral surface A3. The width H2 of the engagement protrusive portion A1, that is the length in the radius direction between an inner peripheral surface A2 and the outer peripheral surface A3 of the engagement protrusive portion A, is not less than the width H1, that is the length in the radius direction between a side wall peripheral surface 503F of the engagement groove 503E and the inner wall 507A of the casing K0. The protrusive portions A4 may be a single protrusive portion A4. Further, the thickness L2 (the length in the axial direction X) of the engagement protrusive portion A1 of the diaphragm A is slightly (practically, about 0.1 mm) larger than the groove width L1 (the length in the axial direction X) of the engagement groove 503E. In the present embodiment, it may also be possible to set the thickness L2 and the groove width L1 to be the same size.

The diaphragm A may be preferably made of high-strength millable (heat vulcanizing) silicone rubber having excellent abrasion resistance. The elastic cushion 509 may be preferably made of foamed material having the initial hardness of "Asker C 30–85" and the apparent specific gravity of 0.30–0.70. The details thereof are substantially the same as those discussed in the first through ninth embodiments, so the detailed description thereof will not be done here.

There is formed a projective portion 503G comprising two projections on the side wall peripheral surface 503F of the engagement groove 503E, projecting in the outward radius direction D2. Accordingly, the engagement protrusive portion A1 of the diaphragm A is fixed on and secured to the main body 503 and the casing K0, by the engagement groove 503E of the main body 503 and by the inner wall 507A of the casing K0. Consequently, the projective portion 503G is caught by the inner peripheral surface of the engagement protrusive surface A1, and the engagement protrusive portion A1 is deformed expanding both in radius directions (D1 and D2 of FIG. 24) and in the perpendicular directions (upward and downward of the axis X). Accordingly, the outer peripheral surface A3 is pressed by the inner wall 507A of the casing K0, and because of the reaction force thereof, the inner peripheral surface A2 of the engagement protrusive portion A1 is strongly pressed by the projective portion 503G.

There is a thin lip portion A5 formed in the inward radius direction D1 at the lower part of the engagement protrusive portion A1. If the liquid intrudes into the engagement groove 503E, since the lip portion A5 has a pressure receiving surface A6 which receives the liquid pressure J1 in the direction substantially perpendicular to that of the force originally applied thereto by the liquid pressure J1, the direction of force of liquid pressure J1 is converted to the direction applying that force to the pressure receiving surface A6. Thus the lip portion A5 becomes in close contact with the lower portion of the engagement groove 503E, thereby the tight liquid sealing performance is accomplished.

The function of the liquid hammer prevention device 500 of the twelfth embodiment, having the structure as above discussed, will now be described. The engagement groove 503E provided at the head 503D of the main body 503 is engaged with the engagement protrusive portion A1, formed at the opening rim of the diaphragm A protruding in the inward radius direction D1. The diaphragm A is fixed on and secured to the space between the casing K0 and the main body 503, by engagement of the engagement protrusive portion A1 with the engagement groove 503E of the main body 503, and with the inner wall 507A of the casing K0. Thus the diaphragm A partitions the space inside the casing K0 into two areas, that is, the area S501 led to the fluid channel via the passage hole 501, and the area S502 provided for the elastic cushion 509 incorporated in the casing K0.

The engagement structure of the engagement protrusive portion A1 with the engagement groove 503E serves as the sealing means of the area S501 led to the fluid channel via the passage hole 501, and the sealing means of the area S502 provided inside the casing K0 in order to accommodate the elastic cushion 509 therein. The engagement protrusive portion A1 of the diaphragm A has protrusive portions A4 outwardly protruding in the radius direction, provided on an outer peripheral surface A3. The width H2 of the engagement protrusive portion A1, that is the length in the radius direction between the inner peripheral surface A2 and the outer peripheral surface A3 of the engagement protrusive portion A, is not less than the width H1, that is the length in the radius direction between the side wall peripheral surface 503F of the engagement groove 503E and the inner wall 507A of the casing K0. Consequently, since the engagement protrusive portion A1 is engaged with the engagement groove 503E of the main body 503 and is secured to and fixed on the inner wall 507A of the casing K0, the outer peripheral surface A3 of the engagement protrusive portion A1 is pressed by the inner wall 507A of the casing K0, thereby the engagement protrusive portion A1 is deformed expanding both in the inward radius direction D1 and the outward radius direction D2. Further, both the top and the bottom of the engagement protrusive portion A1 are also deformed expanding in the axial direction X. Accordingly, the inner peripheral surface A2 of the engagement protrusive portion A1 is pressed by the side wall peripheral surface 503F of the engagement groove 503E. In addition, the projective portion 503G is caught by the inner peripheral surface of the engagement protrusive surface A1, thus the engagement protrusive portion A1 is further deformed expanding in the inward radius direction D2. Accordingly, the outer peripheral surface A3 is pressed by the inner wall 507A of the casing K0, and because of the reaction force generated thereby, the inner peripheral surface A2 of the engagement protrusive portion A1 is strongly pressed by the projective portion 503G, thereby each of the areas S501 and S502 is tightly sealed.

The thickness L2 (the length in the axial direction X) of the engagement protrusive portion A1 of the diaphragm A is slightly (practically, about 0.1 mm) larger than the groove width L1 (the length in the axial direction X) of the engagement groove 503E. Thus the top and the bottom of the engagement protrusive portion A1 are respectively pressed by the upper end and the lower end of the engagement groove 503E, thereby the tight liquid sealing performance is also maintained.

As above discussed, there is the thin lip portion A5 formed in the inward radius direction D1 at the lower part of the engagement protrusive portion A1. Although the tight sealing performance of the present invention has been secured as discussed above, if by some accident the liquid intrudes into the engagement groove 503E, since the lip portion A5 becomes in close contact with the lower portion of the engagement groove 503E, the tight liquid sealing performance is accomplished by this structure.

Accordingly, because of strong and tight liquid sealing force applied to the space between the engagement protrusive portion A1 and the inner peripheral surface A2 of the engagement groove 503E, the intrusion of liquid, from the area S501 led to the fluid channel via the passage hole 501, into the space around the elastic cushion 509 incorporated in the area S502 of the casing K0, may be prohibited.

According to the result of this burst test, the liquid hammer prevention device as above discussed withstood 15.1 MPa of water pressure and showed no leakage of water out of the casing. Further, the casing of the tested device was cut and opened, and there showed no leakage of water out of the diaphragm.

The liquid hammer prevention device 500 according to the twelfth embodiment has the following function. First, when the engagement protrusive portion A1 is engaged with the engagement groove 503E of the main body 503 by the protrusive portions A4 of the outer peripheral surface A3 of the engagement protrusive portion A1, the engagement protrusive portion A1 is deformed expanding both in the inward radius direction D1 and the outward radius direction D2. Further, because of the projective portion 503G of the engagement groove 503E, the inner peripheral surface A2 of the engagement protrusive portions A1 is caught inwardly by the engagement groove 503E, thereby the engagement protrusive portion A1 is also deformed expanding in the radius directions D1, D2 and in the axial direction X. Accordingly, the outer peripheral surface A3 of the engagement protrusive portion A1 is pressed by the side wall 507A of the casing K0, and the inner peripheral surface A2 of the engagement protrusive portion A1 is strongly pressed by the projective portion 503G by the reaction force. Accordingly, the strong and tight liquid sealing performance is maintained, and there is no possibility of intrusion of fluid, from the area led to the fluid channel via the passage hole, into the other area inside the casing in which the elastic cushion is incorporated, thus the floating of elastic cushion in the fluid will not occur, so the excellent performance serving as the liquid hammer prevention device can be maintained for a long time as discussed in the tenth embodiment.

Second, there is no possibility of leakage of fluid out of the casing K0, so the good condition of the device itself can be maintained. The engagement groove 503E provided at the head 503D of the main body 503 is engaged with the engagement protrusive portion A1, formed at the opening rim of the diaphragm A protruding in the inward radius direction. In addition, the diaphragm A is fixed on and secured to the space between the casing K0 and the main body, by engagement of the engagement protrusive portion A1 with the engagement groove 503E of the main body 503, and with the inner wall 507A of the casing K0. Therefore, the liquid hammer prevention device according to the present embodiment requires less number of assembly parts as well as less number of assembly working steps. So the liquid hammer prevention device may be manufactured at the lower cost, maintaining the uniformity of product quality at the same time.

Figure 25:
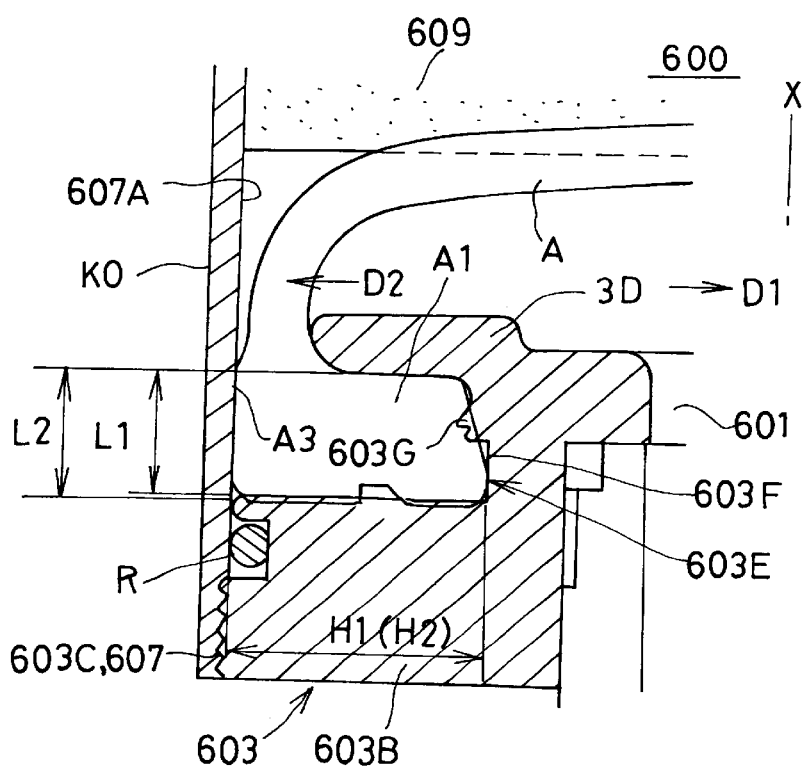
FIG. 25 is a sectional view showing the function of diaphragm according to a thirteenth embodiment of the present invention.
Figure 26:
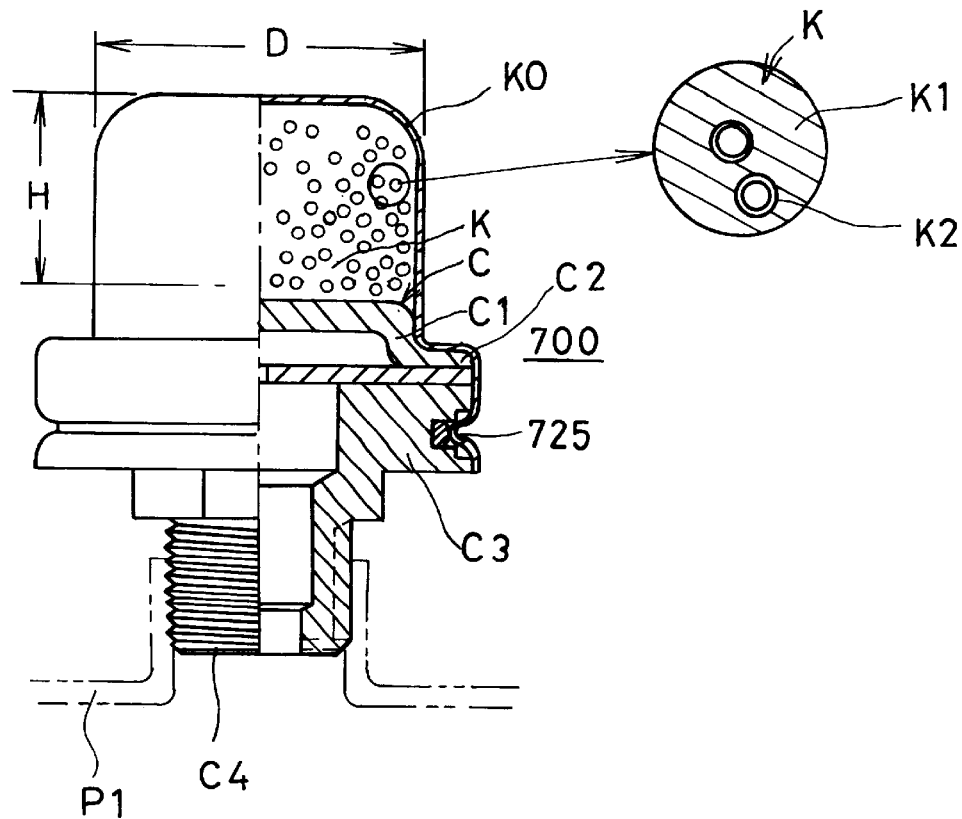
FIG. 26 is a sectional view of an outer flange type of liquid hammer prevention device according to a prior art.
Figure 27:
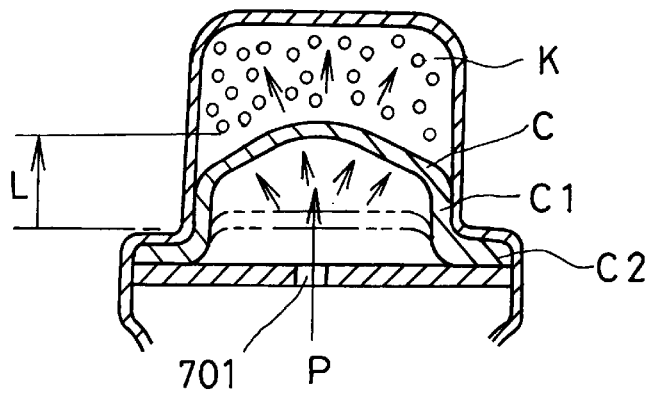
FIG. 27 is a view showing the function of the outer flange type of liquid hammer prevention device according to the prior art.
Figure 28:
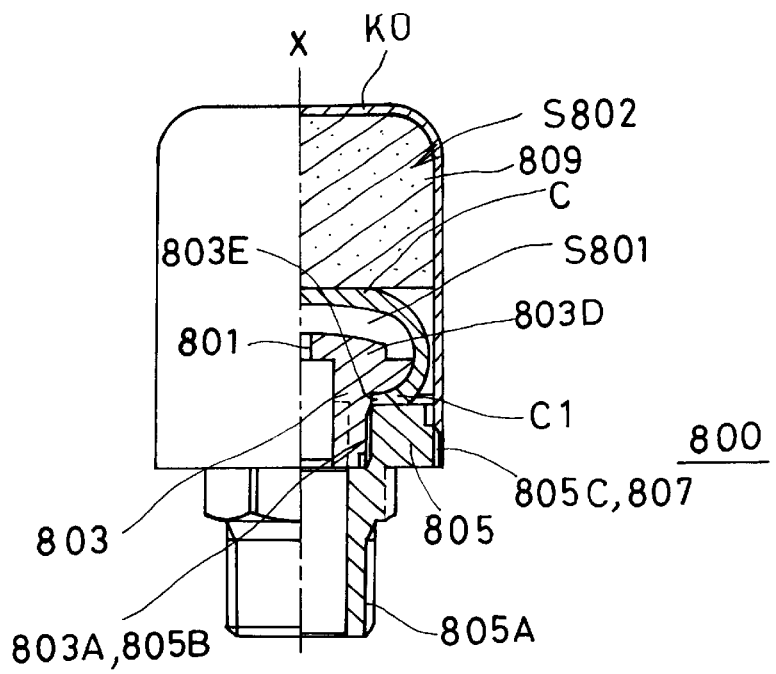
FIG. 28 is a sectional view of an inner-flange and external-attachment type of liquid hammer prevention device according to a prior art.
Figure 29:
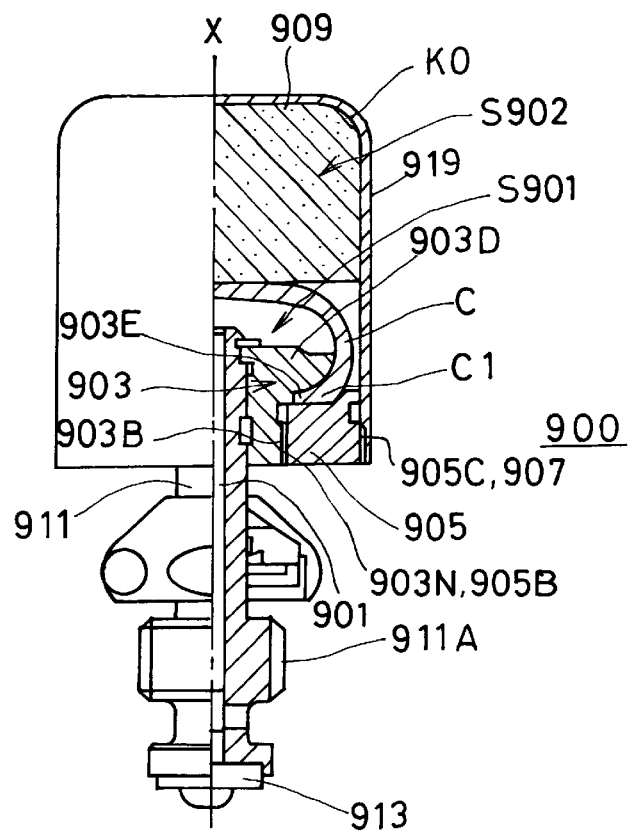
FIG. 29 is a sectional view of an inner-flange and faucet-built-in type of liquid hammer prevention device according to a prior art.

A thirteenth embodiment of the present invention will be described with reference to FIG. 25, illustrating a liquid hammer prevention device 600. The liquid hammer prevention device 600 is provided with protrusive portions 603G outwardly protruding in the radius direction on a side wall peripheral surface 603F of an engagement groove 603E. As illustrated in FIG. 25, the engagement groove 603E is integrally formed at a head 603D of a main body 603 inserted in and secured to the casing K0. The engagement groove 603E is engaged with the engagement protrusive portion A1, formed at the opening rim of the diaphragm A protruding in the inward radius direction D1. The diaphragm A is fixed on and secured to the space between the casing K0 and the main body 603, by engagement of the engagement protrusive portion A1 with the engagement groove 603E of the main body 603 and with an inner wall 607A of the casing K0. Thus the diaphragm A partitions the space inside the casing K0 into two areas, that is, an area led to the fluid channel via the passage hole 601, and another area provided for an elastic cushion 609 incorporated in the casing K0.

The width H2 of the engagement protrusive portion A1, that is the length in the radius direction between an inner peripheral surface A2 and the outer peripheral surface A3 of the engagement protrusive portion A, is substantially the same as the width H1, that is the length in the radius direction between a side wall peripheral surface 603F of the engagement groove 603E and the inner wall 607A of the casing K0. The thickness L2 (the length in the axial direction X) of the engagement protrusive portion A1 of the diaphragm A is slightly (practically, about 0.1 mm) larger than the groove width L1 (the length in the axial direction X) of the engagement groove 603E. In the present embodiment, it may also be possible to set the thickness L2 and the groove width L1 to be the same size.

There are formed protrusive portions 603G comprising two protrusions on the side wall peripheral surface 603F of the engagement groove 603E, protruding in the outward radius direction D2. The protrusive portions 603G may also be a single protrusive portion 603G. Accordingly, the engagement protrusive portion A1 of the diaphragm A is fixed on and secured to the main body 603 and the casing K0, by the engagement groove 603E of the main body 603 and by the inner wall 607A of the casing K0. Consequently, the protrusive portions 603G are caught by the inner peripheral surface of the engagement protrusive surface A1, and the engagement protrusive portion A1 is deformed expanding both in radius directions (D1 and D2) and in the perpendicular directions (upward and downward of the axis X). Accordingly, the outer peripheral surface A3 is pressed by the inner wall 607A of the casing K0, and because of the reaction force thereof, the inner peripheral surface A2 of the engagement protrusive portion A1 is strongly pressed by the protrusive portions 603G. The other structure is substantially the same as that of the twelfth embodiment, so the detailed description thereof will not be done here.

Now the function of the liquid hammer prevention device 600 of the thirteenth embodiment, having the structure as above discussed, will be described. The engagement groove 603E provided at the head 603D of the main body 603 is engaged with the engagement protrusive portion A1, formed at the opening rim of the diaphragm A protruding in the inward radius direction D1. The diaphragm A is fixed on and secured to the space between the casing K0 and the main body 603, by engagement of the engagement protrusive portion A1 with the engagement groove 603E of the main body 603 and with the inner wall 607A of the casing K0. The protrusive portions 603G protrusively formed in the outward radius direction on the outer peripheral portion 603F of the engagement groove 603E are pressed by and incorporated in the inner peripheral surface A2 of the engagement protrusive portion A1, thereby the engagement protrusive portion A1 is deformed expanding in the outward radius direction D2. Further, both the top and the bottom of the engagement protrusive portion A1 are also deformed expanding in the axial direction X. Accordingly, the outer peripheral surface A3 of the engagement protrusive portion A1 is pressed by the inner wall 607A of the casing K0, and because of reaction force generated thereby, the inner peripheral surface A2 of the engagement protrusive portion A1 is simultaneously pressed by the protrusive portions 603G. Thus the tight liquid sealing function is maintained both on the outer peripheral portion A3 and on the inner peripheral portion A2 of the engagement protrusive portion A1.

The thickness L2 (the length in the axial direction X) of the engagement protrusive portion A1 of the diaphragm A is slightly (practically, about 0.1 mm) larger than the groove width L1 (the length in the axial direction X) of the engagement groove 603E. Thus the top and the bottom of the engagement protrusive portion A1 are respectively pressed by the upper end and the lower end of the engagement groove 603E, thereby the tight liquid sealing performance is also maintained.

Accordingly, because of strong and tight liquid sealing force applied to the space between the engagement protrusive portion A1 and the inner peripheral surface A2 of the engagement groove 603E, the intrusion of liquid, from the area S601 led to the fluid channel via the passage hole 601, into the space around the elastic cushion 609 incorporated in the area S602 of the casing K0, may be prohibited.

As above discussed, the liquid hammer prevention device 600 according to the thirteenth embodiment has the following function. First, when the protrusive portions 603G of the engagement groove 603E is pressed by and incorporated in the inner peripheral surface A2 of the engagement protrusive portion A1, the engagement protrusive portion A1 is deformed expanding in the outward radius direction D2 and in the axial direction X. Accordingly, the outer peripheral surface A3 of the engagement protrusive portion A1 is pressed by the side wall 607A of the casing K0, and because of the reaction force generated thereby, the inner peripheral surface A2 of the engagement protrusive portion A1 is strongly pressed by the protrusive portions 603G. Accordingly, the strong and tight liquid sealing performance is maintained, and there is no possibility of intrusion of fluid, from the area led to the fluid channel via the passage hole, into the other area inside the casing in which the elastic cushion is incorporated, thus the floating of elastic cushion in the fluid will not occur, so the excellent performance serving as the liquid hammer prevention device can be maintained for a long time as discussed in the tenth embodiment.

Second, there is no possibility of leakage of fluid out of the casing K0, so the good condition of the device itself can be maintained. The engagement groove 603E provided at the head 603D of the main body 603 is engaged with the engagement protrusive portion A1, formed at the opening rim of the diaphragm A protruding in the inward radius direction. In addition, the diaphragm A is fixed on and secured to the space between the casing K0 and the main body, by engagement of the engagement protrusive portion A1 with the engagement groove 603E of the main body 603, and with the inner wall 607A of the casing K0. Therefore, the liquid hammer prevention device according to the present embodiment requires less number of assembly parts as well as less number of assembly working steps. So the liquid hammer prevention device may be manufactured at the lower cost, maintaining the uniformity of product quality at the same time.

The liquid hammer prevention device according to the present invention is of course not limited to the above discussed embodiments, and any modification and variation is possible without departing from the spirit and the scope of the present invention. For example, the engagement protrusive portion A1 of the liquid hammer prevention device according to the tenth, eleventh or thirteenth embodiment may be provided with the thin lip portion A5 discussed in the twelfth embodiment (see FIG. 24), so that the same function as that of the twelfth embodiment may be presented. Further, the casing 20 may be made of any type of reinforced plastic, stainless steel or other material. The material of the diaphragm A may also be changed. The liquid hammer prevention device according to the present invention is not limited to use only for preventing the noise generated by sudden and radical pressure surge, for example due to sudden closure operation of valve in the piping system, but also for preventing the noise generated by self-inducted vibration such as the surge of centrifugal pump, centrifugal compressor, etc., as well as for preventing the pulsation generated by pulsating flow of pump.

As above discussed, according to the liquid hammer prevention device of the present invention, since the elastic cushion is made of foamed material having the initial hardness of "Asker C 30–85" and the apparent specific gravity of 0.30–0.70, the liquid hammer prevention function having excellent energy absorption and damping performance can be maintained for a long time. In addition, the shape of the elastic cushion may be freely determined, so the downsizing of the liquid hammer prevention device may be accomplished.

The liquid hammer prevention device according to the present invention has the engagement protrusive portion, protruding in the inward radius direction at the opening rim of the diaphragm, being fixed on and secured to the main body and the casing by engagement with the engagement groove of the main body and by the inner wall of the casing. When this liquid hammer prevention device is the inner flange type, the strong and tight liquid sealing performance is maintained, and there is no possibility of intrusion of fluid, from the area led to the fluid channel via the passage hole, into the other area inside the casing in which the elastic cushion is incorporated, thus the floating of elastic cushion in the fluid will not occur, so the excellent performance serving as the liquid hammer prevention device can be maintained for a long time. In addition, there is no possibility of leakage of fluid out of the casing, so the good condition of the device itself can be maintained. Further, the liquid hammer prevention device according to the present invention requires less number of assembly parts as well as less number of assembly working steps. So the liquid hammer prevention device may be manufactured at the lower cost, maintaining the uniformity of product quality at the same time.

When the liquid hammer prevention device as above discussed is also provided with the thin lip portion formed in the inward radius direction at the lower part of the engagement protrusive portion, if by some accident the liquid intrudes into the engagement groove, since the lip portion becomes in close contact with the lower portion of the engagement groove, tighter and stronger liquid sealing performance is accomplished by this structure.

What is claimed is:

1. A liquid hammer prevention device comprising: a casing led to a fluid channel via passage hole; an elastic cushion incorporated in said casing; and a diaphragm partitioning the inside of said casing into an area led to said fluid channel and another area incorporating said elastic cushion, wherein said elastic cushion is a foamed material of which initial hardness falls under the range of "Asker C 30 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.70.

2. The liquid hammer prevention device as claimed in claim 1, wherein, said elastic cushion is a low-profile shape having small height and large diameter; said diaphragm is in a flat plate shape of which diameter being larger than the diameter of said elastic cushion; and an outer rim of said diaphragm is supported by an inner wall of said casing.

3. The liquid hammer prevention device as claimed in claim 1, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said diaphragm is provided with a protrusive portion protruding in the outward radius direction of which width in the radius direction between an inner peripheral surface and an outer peripheral surface of said engagement protrusive portion being not less than the width in the radius direction between a side wall peripheral surface and said inner wall of said casing.

4. The liquid hammer prevention device as claimed in claim 3, wherein said diaphragm is provided at the bottom of said engagement protrusive portion with a thin lip portion protruding in the inward radius direction being in tight contact by liquid pressure function with a lower surface of said engagement groove.

5. The liquid hammer prevention device as claimed in claim 1, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said main body is provided on a side wall peripheral surface of said engagement groove with a projective portion projecting in the outward radius direction.

6. The liquid hammer prevention device as claimed in claim 5, wherein said diaphragm is provided at the bottom of said engagement protrusive portion with a thin lip portion protruding in the inward radius direction being in tight contact by liquid pressure function with a lower surface of said engagement groove.

7. The liquid hammer prevention device as claimed in claim 1, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said diaphragm is provided with a protrusive portion protruding in the outward radius direction of which width in the radius direction between an inner peripheral surface and an outer peripheral surface of said engagement protrusive portion being not less than the width in the radius direction between a side wall peripheral surface and said inner wall of said casing, and said main body is provided on a side wall peripheral surface of said engagement groove with a projective portion projecting in the outward radius direction.

8. The liquid hammer prevention device as claimed in claim 1, wherein said diaphragm is provided at the bottom of said engagement protrusive portion with a thin lip portion protruding in the inward radius direction being in tight contact by liquid pressure function with a lower surface of said engagement groove.

9. A liquid hammer prevention device comprising: a casing led to a fluid channel via passage hole; an elastic cushion incorporated in said casing; and a diaphragm partitioning the inside of said casing into an area led to said fluid channel and another area incorporating said elastic cushion, wherein said elastic cushion is a foamed material of which initial hardness falls under the range of "Asker C 50 and 85" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.40.

10. The liquid hammer prevention device as claimed in claim 9, wherein, said elastic cushion is a low-profile shape having small height and large diameter; said diaphragm is in a flat plate shape of which diameter being larger than the diameter of said elastic cushion; and an outer rim of said diaphragm is supported by an inner wall of said casing.

11. The liquid hammer prevention device as claimed in claim 9, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said diaphragm is provided with a protrusive portion protruding in the outward radius direction of which width in the radius direction between an inner peripheral surface and an outer peripheral surface of said engagement protrusive portion being not less than the width in the radius direction between a side wall peripheral surface and said inner wall of said casing.

12. The liquid hammer prevention device as claimed in claim 11, wherein said diaphragm is provided at the bottom of said engagement protrusive portion with a thin lip portion protruding in the inward radius direction being in tight contact by liquid pressure function with a lower surface of said engagement groove.

13. The liquid hammer prevention device as claimed in claim 9, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said main body is provided on a side wall peripheral surface of said engagement groove with a projective portion projecting in the outward radius direction.

14. The liquid hammer prevention device as claimed in claim 13, wherein said diaphragm is provided at the bottom of said engagement protrusive portion with a thin lip portion protruding in the inward radius direction being in tight contact by liquid pressure function with a lower surface of said engagement groove.

15. The liquid hammer prevention device as claimed in claim 9, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said diaphragm is provided with a protrusive portion protruding in the outward radius direction of which width in the radius direction between an inner peripheral surface and an outer peripheral surface of said engagement protrusive portion being not less than the width in the radius direction between a side wall peripheral surface and said inner wall of said casing, and said main body is provided on a side wall peripheral surface of said engagement groove with a projective portion projecting in the outward radius direction.

16. The liquid hammer prevention device as claimed in claim 15, wherein said diaphragm is provided at the bottom of said engagement protrusive portion with a thin lip portion protruding in the inward radius direction being in tight contact by liquid pressure function with a lower surface of said engagement groove.

17. A liquid hammer prevention device comprising: a casing led to a fluid channel via passage hole; an elastic cushion incorporated in said casing; and a diaphragm partitioning the inside of said casing into an area led to said fluid channel and another area incorporating said elastic cushion, wherein said elastic cushion is a foamed material of which initial hardness falls under the range of "Asker C 55 and 70" according to Japanese Industrial Standard S 6050 measured by the level gauge of a durometer "Asker C" manufactured by Kobunshi Keiki Co., Ltd. of Kyoto, Japan, and of which apparent specific gravity falls under the range of 0.30 and 0.40.

18. The liquid hammer prevention device as claimed in claim 17, wherein, said elastic cushion is a low-profile shape having small height and large diameter; said diaphragm is in a flat plate shape of which diameter being larger than the diameter of said elastic cushion; and an outer rim of said diaphragm is supported by an inner wall of said casing.

19. The liquid hammer prevention device as claimed in claim 17, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said diaphragm is provided with a protrusive portion protruding in the outward radius direction of which width in the radius direction between an inner peripheral surface and an outer peripheral surface of said engagement protrusive portion being not less than the width in the radius direction between a side wall peripheral surface and said inner wall of said casing.

20. The liquid hammer prevention device as claimed in claim 19, wherein said diaphragm is provided at the bottom of said engagement protrusive portion with a thin lip portion protruding in the inward radius direction being in tight contact by liquid pressure function with a lower surface of said engagement groove.

21. The liquid hammer prevention device as claimed in claim 17, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said main body is provided on a side wall peripheral surface of said engagement groove with a projective portion projecting in the outward radius direction.

22. The liquid hammer prevention device as claimed in claim 21, wherein said diaphragm is provided at the bottom of said engagement protrusive portion with a thin lip portion protruding in the inward radius direction being in tight contact by liquid pressure function with a lower surface of said engagement groove.

23. The liquid hammer prevention device as claimed in claim 17, comprising: a casing; an elastic cushion incorporated in said casing; a main body positioned inside said casing and having a passage hole led to a fluid channel; and a diaphragm having at the opening rim an engagement protrusive portion protruding in the inward radius direction and being engaged with an engagement groove formed at a head of said main body, thereby said engagement protrusive portion being secured to and fixed on said engagement groove and an inner wall of said casing, wherein, said diaphragm is provided with a protrusive portion protruding in the outward radius direction of which width in the radius direction between an inner peripheral surface and an outer peripheral surface of said engagement protrusive portion being not less than the width in the radius direction between a side wall peripheral surface and said inner wall of said casing, and said main body is provided on a side wall peripheral surface of said engagement groove with a projective portion projecting in the outward radius direction.

24. The liquid hammer prevention device as claimed in claim 23, wherein said diaphragm is provided at the bottom of said engagement protrusive portion with a thin lip portion protruding in the inward radius direction being in tight contact by liquid pressure function with a lower surface of said engagement groove.

* * * * *